(12) United States Patent
Okawa

(10) Patent No.: US 9,009,417 B2
(45) Date of Patent: Apr. 14, 2015

(54) STORAGE CONTROL APPARATUS AND OPERATING MODE CONTROL METHOD OF STORAGE CONTROL APPARATUS

(75) Inventor: Tomoaki Okawa, Manazuru (JP)

(73) Assignee: Hitachi, Ltd., Tokyo (JP)

( * ) Notice: Subject to any disclaimer, the term of this patent is extended or adjusted under 35 U.S.C. 154(b) by 1240 days.

(21) Appl. No.: 12/934,037

(22) PCT Filed: Aug. 27, 2010

(86) PCT No.: PCT/JP2010/005305
§ 371 (c)(1),
(2), (4) Date: Sep. 22, 2010

(87) PCT Pub. No.: WO2012/025972
PCT Pub. Date: Mar. 1, 2012

(65) Prior Publication Data
US 2012/0221801 A1  Aug. 30, 2012

(51) Int. Cl.
G06F 12/00 (2006.01)
G06F 12/08 (2006.01)
G06F 1/32 (2006.01)
G06F 11/14 (2006.01)
G06F 13/00 (2006.01)
(Continued)

(52) U.S. Cl.
CPC .......... *G06F 12/0804* (2013.01); *G06F 1/3212* (2013.01); *G06F 1/3275* (2013.01); *G06F 11/1441* (2013.01); *G06F 11/201* (2013.01); *G06F 11/2015* (2013.01); *G06F 11/2089* (2013.01); *G06F 12/0866* (2013.01); *G06F 2212/2228* (2013.01); *Y02B 60/1225* (2013.01)

(58) Field of Classification Search
CPC . G06F 12/0804; G06F 1/3212; G06F 1/3275; G06F 11/2089; G06F 11/201
USPC .................... 711/162, 142, 113, 143; 713/340
See application file for complete search history.

(56) References Cited

U.S. PATENT DOCUMENTS 5,341,493 A * 8/1994 Yanai et al. .................... 711/161
5,761,705 A   6/1998 DeKoning et al.
(Continued)

FOREIGN PATENT DOCUMENTS

EP  0 342 846 A2  11/1989
JP  10-105467 A    4/1998
(Continued)

OTHER PUBLICATIONS

International Search Report and Written Opinion received in International Application No. PCT/JP2010/005305, mailed Jun. 17, 2011.

*Primary Examiner* — Yaima Rigol
*Assistant Examiner* — Mark Giardino, Jr.
(74) *Attorney, Agent, or Firm* — Foley & Lardner LLP

(57) ABSTRACT

It is an object to improve a reliability of a data protection for a storage control apparatus that is provided with a redundant configuration that is made of a plurality of clusters.
A memory unit in each of the clusters C1 and C2 is provided with a first memory 3 having a volatile property, a battery 5 that is configured to supply an electrical power to the first memory 3, and a second memory 4 that stores data that is transferred from the first memory 3 in the case of a power outage. A control unit selects an operating mode for protecting data from a normal mode, a write through mode, and an access disable mode (a not ready state) based on a remaining power level of the battery 5.

11 Claims, 16 Drawing Sheets

(51) Int. Cl.
  *G06F 13/28* (2006.01)
  *G06F 11/20* (2006.01)

(56) References Cited

U.S. PATENT DOCUMENTS

| | | |
|---|---|---|
| 6,052,789 A | 4/2000 | Lin |
| 2004/0054851 A1 | 3/2004 | Acton et al. |
| 2008/0005474 A1 | 1/2008 | Long |
| 2010/0180131 A1 | 7/2010 | Liu |
| 2011/0197036 A1 | 8/2011 | Ishii |

FOREIGN PATENT DOCUMENTS

| | | |
|---|---|---|
| JP | 2006-313407 | 11/2006 |
| JP | 2006-313407 A | 11/2006 |
| JP | 2011-164780 A | 8/2011 |

\* cited by examiner

First threshold value and initial value management table — T10A

| Cluster # (C10A) | Initial threshold value (C11A) |
|---|---|
| Cluster C1 | Th1 |
| Cluster C2 | Th1 |

(b)

Second threshold value and initial value management table — T10B

| Cluster # (C10B) | Initial threshold value (C11B) |
|---|---|
| Cluster C1 | Th2 |
| Cluster C2 | Th2 |

First threshold value modification table — T20A

| Number of the data caches (C20A) | Th1 (C21A) |
|---|---|
| 2 | Th1a(=35%) |
| 4 | Th1b(=40%) |
| 6 | Th1c(=45%) |
| 8 | Th1(=50%) |

(b)

Second threshold value modification table — T20B

| Number of the management data caches (C20B) | Th2 (C21B) |
|---|---|
| 2 | Th2a(=20%) |
| 4 | Th2(=25%) |

STORAGE CONTROL APPARATUS AND OPERATING MODE CONTROL METHOD OF STORAGE CONTROL APPARATUS

TECHNICAL FIELD

The present invention relates to a storage control apparatus and an operating mode control method of a storage control apparatus.

BACKGROUND ART

A corporate user and others manage data by using a storage control apparatus. The storage control apparatus stores user data to a redundant storage area based on a RAID (Redundant Array of Independent (or Inexpensive) Disks) in order to protect data.

The storage control apparatus is provided with a battery, and is configured to write dirty data that has been stored in only a cache memory to a storage apparatus by an electrical power from the battery in the case in which a power outage occurs (see Patent Literature 1). In a conventional art that is disclosed in the Patent Literature, as a remaining power level of a battery is less, a permissible amount of dirty data becomes less. In addition, in the case in which a remaining power level of a battery becomes equal to or less than a threshold value, a write back operation is switched to a write through operation.

CITATION LIST

Patent Literature

PTL 1: Japanese Patent Application Laid-Open Publication No. 2006-313407

SUMMARY OF INVENTION

Technical Problem

The conventional art that is disclosed in the Patent Literature is not provided with a redundant configuration. Consequently, it is difficult to apply the conventional art without modification to a storage control apparatus that includes a redundant configuration that is provided with a plurality of batteries or the like. Moreover, although the configuration for a storage control apparatus can be modified as needed, an operating mode for protecting data cannot be corresponded to a configuration modification for the conventional art.

Therefore, an object of the present invention is to provide a storage control apparatus and an operating mode control method of a storage control apparatus in which a reliability and a usability can be compatible for a storage control apparatus that is provided with a redundant configuration. The further objects of the present invention will be disclosed by the descriptions of the embodiment described later.

Solution of Problem

The present invention was made in order to solve the above problems of the conventional art. A storage control apparatus that complies with the first aspect of the present invention is a storage control apparatus that inputs/outputs data in accordance with a request from a higher level device, and comprises a redundant configuration that is made of a plurality of clusters, wherein each of the clusters is provided with a first communication control unit that is configured to communicate with the higher level device; a second communication control unit that is configured to communicate with a storage apparatus that stores data; a memory unit that is used by the first communication control unit and the second communication control unit; and a control unit that is configured to control the first communication control unit and the second communication control unit, the memory unit in each of the clusters is provided with a first memory having a volatile property and a battery that is configured to supply an electrical power to the first memory, and each of the control units controls an operating mode for protecting data based on a remaining power level of each battery.

Viewed from a second aspect, for the storage control apparatus at the first aspect, each of the clusters is provided with a management terminal that is configured to manage a status in each of the clusters, each of the memory units is provided with a second memory having a nonvolatile property, the first memory is provided with a data memory that is configured to store data and a management data memory that is configured to store management data, each of the control units is provided with a setting of a first threshold value that indicates a remaining power level of a battery that is required to save the data that has been stored into the data memory and the management data that has been stored into the management data memory to the second memory and a second threshold value that indicates another remaining power level of a battery that is required to save the management data that has been stored into the management data memory to the second memory in such a manner that the threshold values can be changed, each of the control units detects the remaining power level of a battery in each of the clusters, each of the control units executes a first judgment for judging whether or not the remaining power level of a battery is equal to or larger than the first threshold value, in the case in which the result of the first judgment is positive, each of the control units executes a normal mode for notifying the higher level device of a write processing completion at a point of time when the write data from the higher level device is stored into each of the data memories, in the case in which the result of the first judgment is negative, each of the control units executes a second judgment for judging whether or not the remaining power level of one of the batteries is equal to or larger than the first threshold value and the remaining power level of the other of the batteries is less than the first threshold value, in the case in which the result of the second judgment is positive, each of the control units outputs an alarm via the management terminal and executes the normal mode, in the case in which the result of the second judgment is negative, each of the control units executes a third judgment for judging whether or not the remaining power level of the battery is equal to or larger than the second threshold value and is less than the first threshold value, in the case in which the result of the third judgment is positive, each of the control units outputs an alarm via the management terminal and executes a write through mode for notifying the higher level device of a write processing completion after a point of time when the write data from the higher level device is stored into the data memory that belongs to the cluster same as the control unit and the storage apparatus, in the case in which the result of the third judgment is negative, each of the control units executes a fourth judgment for judging whether or not the remaining power level of one of the batteries is equal to or larger than the second threshold value and the remaining power level of the other of the batteries is less than the second threshold value, in the case in which the result of the fourth judgment is positive, each of the control units outputs an alarm via the management terminal and executes a write through mode for the cluster same as the control unit, in the case in which the result of the fourth judgment is negative, each of the control units sets an access disable state for inhibiting an access from the higher level device and outputs an alarm via the management terminal, in the case in which the result of the fourth judgment is negative even after a predetermined period of time passes, each of the control units sets an access able state for permitting an access from the higher level device and executes a write through mode, in the case in which an input voltage to the battery is stopped, each of the control units starts a save processing for transferring the data and the management data that have been stored into the first memory to the second memory for the cluster same as the control unit, in the case in which an input voltage to the battery is recovered, the save processing is stopped in the case in which the remaining power level of the battery is equal to or larger than the first threshold value, and the save processing is continued in the case in which the remaining power level of the battery is less than the first threshold value, and each of the control units sets the first threshold value in accordance with the number of the data memories that are included in the first memory and sets the second threshold value in accordance with the number of the management data memories that are included in the first memory.

Viewed from a third aspect, for the storage control apparatus at the first aspect, each of the memory units is provided with a second memory having a nonvolatile property, the first memory is provided with a data memory that is configured to store data and a management data memory that is configured to store management data, an operating mode that is configured to protect data is provided with:

a normal mode for notifying the higher level device of a write processing completion at a point of time when the write data from the higher level device is stored into each of the data memories;

a write through mode for notifying the higher level device of a write processing completion after a point of time when the write data from the higher level device is stored into the data memory and the storage apparatus; and an access disable mode for inhibiting an access from the higher level device, in the case in which at least one of remaining power levels of the battery capacities is equal to or larger than the first threshold value that enables to save the data and the management data that have been stored into the first memory to the second memory, the normal mode is selected, in the case in which the both of remaining power levels of each of the batteries is less than the first threshold value and at least one of remaining power levels of the battery capacities is equal to or larger than the second threshold value that enables to save the management data that has been stored into the first memory to the second memory, the write through mode is selected, and in the case in which the both of remaining power levels of each of the batteries is less than the second threshold value and before a predetermined period of time passes, the access disable mode is selected.

Viewed from a fourth aspect, for the storage control apparatus at the third aspect, in the case in which the both of remaining power levels of each of the batteries is less than the second threshold value and a predetermined period of time passes, the access disable mode is switched to the write through mode.

Viewed from a fifth aspect, for the storage control apparatus at the third aspect, in the case in which an input voltage to the battery is stopped, each of the control units starts a save processing for transferring the data and the management data that have been stored into the first memory to the second memory, in the case in which an input voltage to the battery is recovered and the remaining power level of the battery is equal to or larger than the first threshold value that enables to save the data and the management data that have been stored into the first memory to the second memory, the save processing is stopped, and in the case in which an input voltage to the battery is recovered and the remaining power level of the battery is less than the first threshold value, the save processing is continued, in the cluster to which the control unit belongs.

Viewed from a sixth aspect, for the storage control apparatus at the fifth aspect, the first threshold value is set in accordance with the number of the data memories that are included in the first memory.

Viewed from a seventh aspect, for the storage control apparatus at the sixth aspect, the second threshold value is set in accordance with the number of the management data memories that are included in the first memory.

Viewed from an eighth aspect, for the storage control apparatus at the third aspect, in the case in which a battery of the cluster to which the control unit belongs among the clusters is exchanged, each of the control units increases the first threshold value that is included in the other control unit by the prescribed value.

This invention can also be comprehended as a method for controlling an operating mode of a storage control apparatus. Furthermore, at least a part of the configuration of the present invention can be configured as a computer program. This computer program can be distributed by being fixed to storage media or via a communication network. Furthermore, other combinations than the combinations of the above-mentioned aspects are also included in the scope of the present invention.

BRIEF DESCRIPTION OF DRAWINGS

FIG. 13 is a table for managing the initial value of a threshold value.

FIG. 14 is a table that is used for a modification of a threshold value.

DESCRIPTION OF EMBODIMENTS

Figure 1:
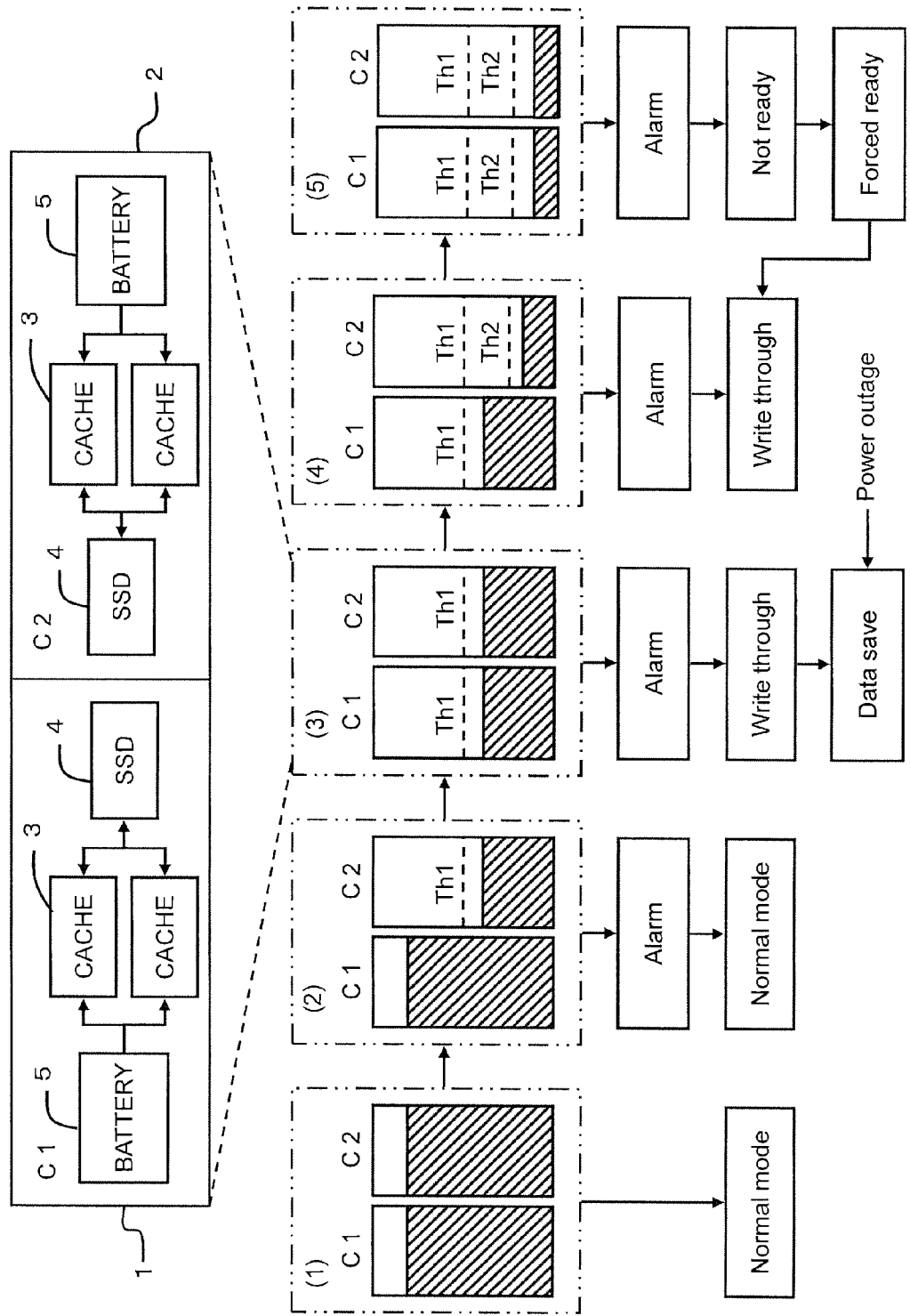
FIG. 1 is an explanatory diagram showing the overall concept in accordance with an embodiment of the present invention.

An embodiment for the present invention will be described below in detail with reference to the drawings. Firstly, the overview of the present invention will be described with reference to FIG. 1, and then the embodiment will be described with reference to FIG. 2 and the subsequent drawings. FIG. 1 is illustrated to the extent required for the understanding and practice of the present invention. The scope of the present invention is not limited to the configuration illustrated in FIG. 1. The characteristics which are not illustrated in FIG. 1 will be disclosed in the embodiment described later.

As shown in the upper side of FIG. 1, a storage control apparatus is provided with a redundant configuration that is made of a cluster 1 and a cluster 2. The detailed configuration examples of each of the clusters 1 and 2 and the storage control apparatus will be described later. Each of the clusters 1 and 2 is provided with a memory package. The memory package is provided with a plurality of cache memories 3, a flash memory device 4, and a battery 5 for instance.

Each of the cache memories 3 holds data by a power feeding from the battery 5. The flash memory device 4 is coupled to each of the cache memories 3. In the case in which a remaining power level of the battery 5 is lowered, data that has been stored in each of the cache memories 3 is transferred to the flash memory device 4, and is stored into the flash memory device 4. In the case in which a remaining power level of the battery 5 is recovered, data that has been saved to the flash memory device 4 is returned to the cache memory 3.

In the lower side of FIG. 1, a relationship between a state of the battery 3 in each of the clusters 1 and 2 and an operating mode is shown schematically. The remaining power level states of the five batteries (1) to (5) and operating modes are shown in the lower side of FIG. 1.

A remaining power level of the battery is compared with a plurality of threshold values Th1 and Th2. A first threshold value Th1 is set as a remaining power level of the battery that can save both of the data (user data) and the management data that have been stored in the cache memory 3 to the flash memory device 4. A second threshold value Th1 is set as a remaining power level of the battery that can save only the management data that has been stored in the cache memory 3 to the flash memory device 4. The user data is data that is used by a host. The management data is data that is used to manage the management information such as a stored destination of data. As described later, each of the threshold values Th1 and Th2 can be modified in accordance with the number of cache memories 3.

As shown in the state (1), in the case in which a remaining power level of each the batteries 5 is equal to or larger than the threshold value Th1, a normal mode is selected as an operating mode. In the normal mode, the host is notified of a write processing completion at a point of time when the write data that has been received from the host is written to the cache memory 3. After that, the write data that has been stored in the cache memory 3 is written to a storage apparatus while timing is judged. Consequently, in the case in which a storage control apparatus is operated in the normal mode, the response performance of a storage control apparatus is improved.

As shown in the state (2), in the case in which the remaining power level of the battery in any one of the clusters 1 and 2 (the cluster 2 in FIG. 1(2)) is less than the first threshold value Th1, an alarm is issued to a user (a manager) that manages the storage control apparatus. For instance, an alarm is issued to a user via a display screen of a management terminal that is coupled to the storage control apparatus or via an e-mail that is transmitted to a user. As an operating mode, a normal mode is selected continuously.

As shown in the state (3), in the case in which the remaining power level of the battery in both of the clusters 1 and 2 is less than the first threshold value Th1, an alarm is issued to a user. That is the case in which the remaining power level of the battery is equal to or larger than the second threshold value Th2 and is less than the first threshold value Th1.

An operating mode is changed from a normal mode to a write through mode. The write through mode is a mode in which the host is notified of a write processing completion after a point of time when the write data that has been received from the host is written to the cache memory 3 and is written to the storage apparatus. In the write through mode, the host is notified of a write processing completion after a point of time when it is confirmed that the write data is written to the storage apparatus. Consequently, in the write through mode, since a notification to the host is delayed as compared with the normal mode, the response performance of the storage control apparatus is deteriorated.

In the case in which a power outage occurs in the case of the state (3), the data and the management data that have been stored into the cache memory 3 is transferred to the flash memory device 4, and is stored into the flash memory device 4. For instance, the management data is saved to the flash memory device 4 at first, and the user data is then saved to the flash memory device 4. In the case in which the user data and the management data are not distinguished in particular, the user data and the management data are called "data".

As describer later moreover, in the case in which a power outage is released during a data save to the flash memory device 4, it is determined whether a data save is continued or stopped in accordance with the remaining power level of the battery. For instance, in the case in which the remaining power level of the battery is equal to or larger than the first threshold value Th1, a data save from the cache memory 3 to the flash memory device 4 is stopped. This is because the data can be saved from the cache memory 3 to the flash memory device 4 even in the case in which a power outage occurs again since the remaining power level of the battery is sufficient. On the other hand, in the case in which the remaining power level of the battery is less than the first threshold value Th1 after a power outage is released, a data save is continued. This is because there is a possibility that a data save cannot be completed normally in the case in which a power outage is repeated. Consequently, in the case in which the remaining power level of the battery is insufficient, a data save is continued even if a power outage is repeated.

Although the case in which a power outage occurs in the case of the state (3) has been described for the sake of convenience of an explanation, there is a possibility that a power outage occurs in any state of the states (1) to (5).

As shown in the state (4), in the case in which the remaining power level of any one of the batteries 5 is equal to or larger than the second threshold value Th2 and the remaining power level of the other of the batteries 5 is less than the second threshold value Th2, an alarm is issued similarly to the state (3) and a write through mode is selected as an operating mode. In the case in which the remaining power level of any one of the batteries 5 is equal to or larger than the second threshold value Th2, the management data in the cache memory 3 can be saved to the flash memory device 4. In the case in which at least one of redundant management data can be saved, the data stored destination and so on can be managed. Consequently, an operation in a write through mode is continued.

As shown in the state (5), in the case in which the remaining power level of each of the batteries 5 is less than the second threshold value Th2, an alarm is issued and a storage control apparatus is set as a not ready state. In other words, a storage control apparatus stops receiving an access request from a host. In the case in which the remaining power level of both of the batteries 5 is less than the second threshold value Th2 and a power outage occurs, there is a possibility that the management data in the cache memory 3 cannot be saved to the flash memory device 4. Even in the case in which the user data that has been received from a host is written to a storage apparatus, the user data cannot be accessed if the management data in which the write destination and so on are managed is lost. Consequently, in the case of the state (5), a usage of a storage control apparatus by a host is inhibited.

In the case in which a storage control apparatus is in a not ready state and the battery 5 is charged, any one of the above states (1) to (4) is entered. On the other hand, in the case in which the battery 5 is not charged sufficiently and a not ready state of a storage control apparatus is continued for at least a predetermined period of time, a storage control apparatus is set as a ready state forcibly. This is because usability is deteriorated and a dissatisfaction of a user is increased in the case in which a storage control apparatus cannot be used for a long period of time.

In other words, in the case in which the remaining power level of each of the batteries 5 is less than the second threshold value Th2, each of the batteries 5 is waited until it is recovered for a predetermined period of time. In the case in which the remaining power level of any one of the batteries 5 is not recovered to be equal to or larger than the second threshold value Th2 even if a predetermined period of time passes, a storage control apparatus is set as a ready state forcibly.

In accordance with the present embodiment that is configured as described above, an operating mode for protecting data can be changed in accordance with a remaining power level of each of the batteries 5 for a storage control apparatus that is provided with a redundant configuration that is made of a plurality of clusters 1 and 2.

In the present embodiment, the memory package is provided with a cache memory 3, a flash memory device 4, and a battery 5, and the data (the management data and the user data) in the cache memory 3 is saved to the flash memory device 4 by using an electrical power from the battery 5 in the case in which a power outage occurs. For such a redundant hardware configuration in the present embodiment, any one of a plurality of modes of a normal mode, a write through mode, and an access disable mode (a mode that is set in a not ready state) is selected as an operating mode by comparing the remaining power level of each of the batteries 5 with a plurality of threshold values Th1 and Th2. Consequently, in the present embodiment, both of a reliability and usability can be improved by using a redundant configuration of a storage control apparatus.

In the present embodiment, in the case in which the remaining power level of each of the batteries 5 is less than the second threshold value Th2, a storage control apparatus is set as a not ready state. In the case in which the not ready state of a storage control apparatus is continued for at least a predetermined period of time, a storage control apparatus is changed to be in a ready state forcibly. By the above configuration, a storage control apparatus can be prevented from being stopped for a long period of time, and usability can be suppressed from being deteriorated.

Embodiment 1

Figure 2:
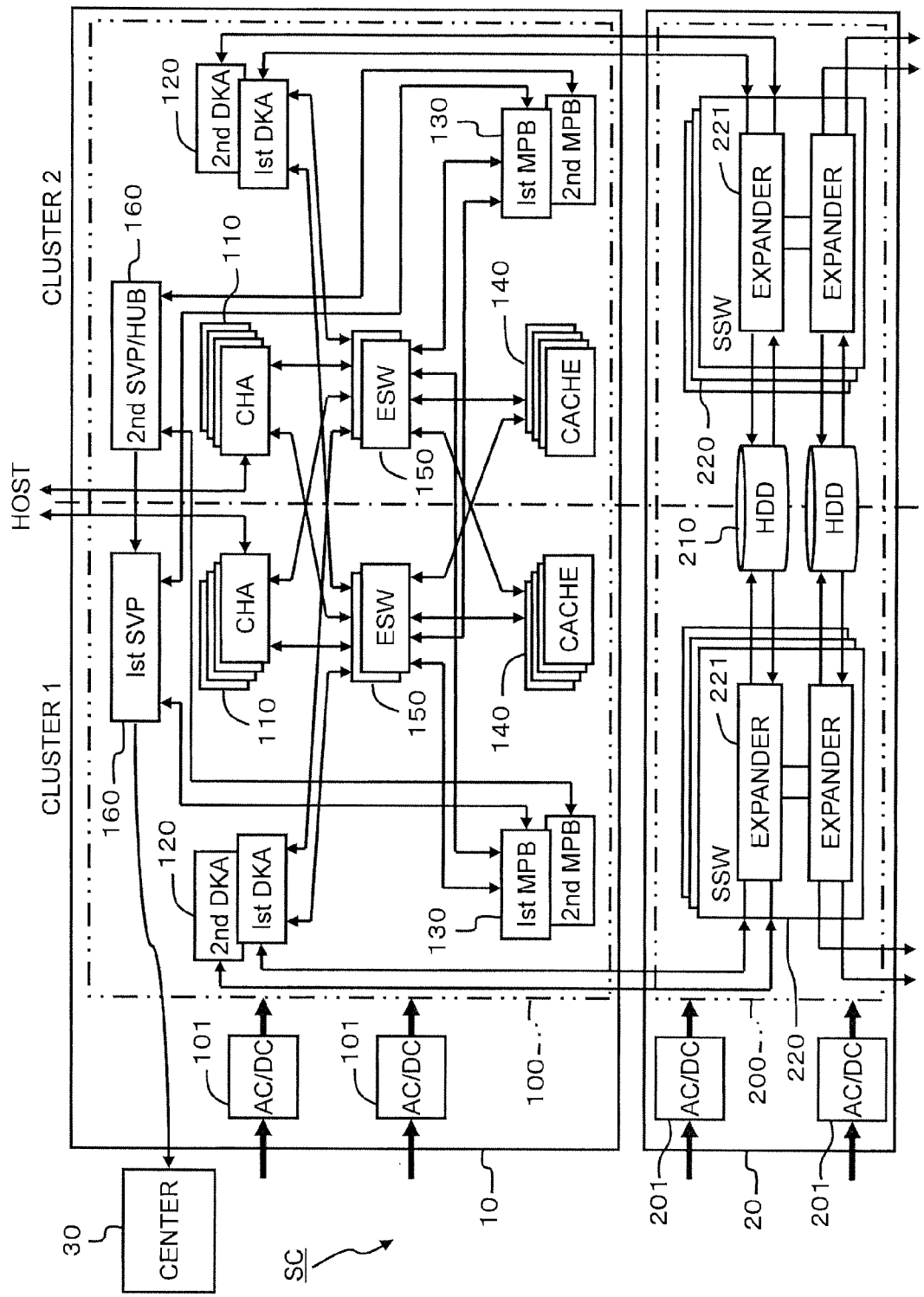
FIG. 2 is a hardware configuration diagram of a storage control apparatus.

FIG. 2 shows an entire configuration of a storage control apparatus SC in accordance with the present embodiment. The storage control apparatus SC includes one controller chassis 10 and at least one drive chassis 20 for instance. The storage control apparatus SC is provided with a redundant configuration that is made of a first cluster shown on the middle left side of FIG. 2 and a second cluster shown on the middle right side of FIG. 2. Each of the clusters is provided with the same configuration, and can be operated with coordination between the first cluster and the second cluster. Consequently, even in the case in which any one of the clusters is stopped due to a failure, the storage control apparatus SC can be operated by the other cluster.

The controller chassis 10 is provided with a controller 100 that is configured to control an operation of the storage control apparatus SC. The first cluster and the second cluster are set to the controller 100, and an electrical power is supplied from a plurality of AC/DC electrical power supplies 101 to each of the clusters. In other words, the AC/DC electrical power supplies 101 are also redundant. Even in the case in which any one of the AC/DC electrical power supplies 101 is stopped due to a failure, an electrical power can be supplied from the other AC/DC electrical power supply 101 to the controller 100.

In the first cluster and the second cluster that are set to the controller 100, the configuration of the controller 100 will be described while the first cluster is focused on. A part that belongs to the first cluster in the controller 100 is provided with a plurality of channel adapters 110, a plurality of disk adapters 120, a plurality of control packages 130, a plurality of memory packages 140, a plurality of switches 150, and at least one management terminal 160. A part that is included the second cluster has the similar configuration.

The channel adapter 110 is corresponded to a first communication control unit. The channel adapter 110 (hereafter referred to as a CHA 110) controls a communication with a host. The CHA 110 receives the various types of commands that have been issued from the host and the write data. The write data that has been received is stored into a cache memory 143 in the memory package 140 (see FIG. 3). The CHA 110 transmits data that has been read from a storage apparatus 210 to the host.

The host, which is not shown in the figure, is configured as a mainframe computer or a server computer of an open series. In the case in which the host is a mainframe computer, the CHA 110 communicates with the host in accordance with a communication protocol such as a FICON (Fibre Connection: registered trademark), an ESCON (Enterprise System Connection: registered trademark), an ACONARC (Advanced Connection Architecture: registered trademark), and a FIBARC (Fibre Connection Architecture: registered trademark). On the other hand, in the case in which the host is a server computer, a data communication is carried out in accordance with a communication protocol such as an FCP (Fibre Channel Protocol), an iSCSI (internet Small Computer System Interface), and a TCP/IP (Transmission Control Protocol/Internet Protocol). The host is not restricted to a server computer or a mainframe computer. As the host for instance, the various types of apparatuses that can issue a command such as a mobile phone, a personal digital assistance, and a television apparatus can also be used in some cases.

The disk adapter 120 is corresponded to a second communication control unit. The disk adapter 120 (hereafter referred to as a DKA 120) controls a communication with each of the storage apparatuses 210 in the drive chassis 20. A communication protocol is not restricted in particular. The DKA 120 communicates with the storage apparatus 210 by using a communication protocol such as an FCP. The DKA 120 reads data from one or a plurality of storage apparatuses 210, and stores the data into a cache memory 143 in the memory package 140.

A microprocessor package 130 is corresponded to a control unit. The microprocessor package 130 communicates with the CHA 110 and the DKA 120, and controls the operations of the CHA 110 and the DKA 120. The microprocessor package 130 is provided with a plurality of microprocessors and a local memory for instance.

The microprocessor package 130 is coupled to the management terminal 160, and modifies the configuration in the storage control apparatus SC in accordance with an instruction that is issued from the management terminal 160. Moreover, the microprocessor package 130 collects the information related to a state inside the storage control apparatus SC, and transmits the information to the management terminal 160.

Figure 3:
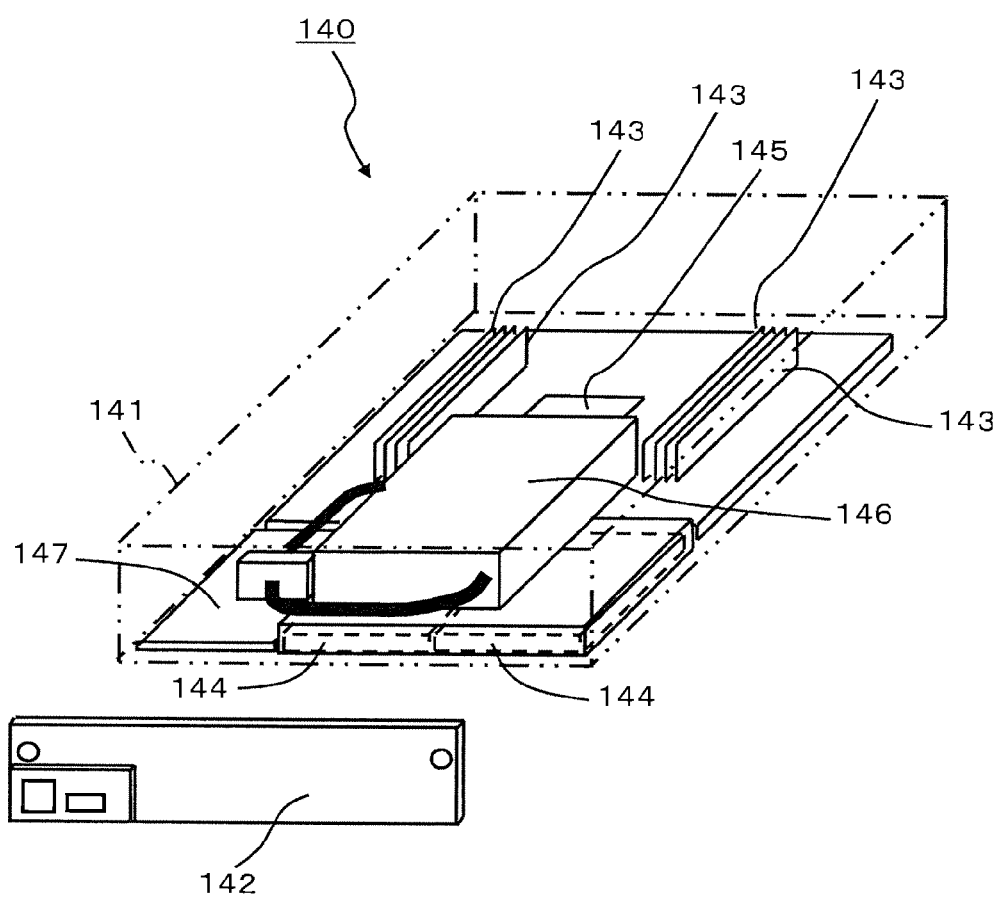
FIG. 3 is a perspective view of a memory package.

The memory package 140 is corresponded to a memory unit. FIG. 3 is a perspective view of the memory package 140. The memory package 140 is provided with a package 141, a face plate 142 that is detachably disposed on the front face of the package 141, a plurality of cache memories 143, a plurality of flash memory devices 144, a memory controller 145, a battery pack 146, and a battery controller 147 for instance.

The cache memory 143 as a first memory is configured by volatile memory. The cache memories 143 are mounted on a board of the memory package 140 in a unit of two pieces for instance. The number of the cache memories 143 can be increased or decreased during an operation of the storage control apparatus SC.

The cache memory 143 is configured by memories of a plurality of types that have different purposes. One of the cache memories 143 is a data cache that is configured to store the user data. The other of the cache memories 143 is a management data cache that is configured to store the management data. In the present embodiment, a maximum of eight data caches can be mounted, and a maximum of four management data caches can be mounted. The minimum number of data caches that can be mounted is two. Similarly, the minimum number of management data caches that can be mounted is also two.

The flash memory device 144 as a second memory is provided with a nonvolatile property. The data (the user data and/or the management data) that has been stored in the cache memory 143 is transferred to and stored in the flash memory device 144 in the case of a power outage. In the case in which a power outage is released, the data that has been saved to the flash memory device 144 is returned and written to the cache memory 143. The flash memory device 144 can be exchanged, increased, or decreased without detaching the cache memory 143.

The memory controller 145 controls a data input/output related to the cache memory 143 and a data input/output related to the flash memory device 144.

The battery pack 146 as a battery is provided with a plurality of cells such as a lithium battery for instance. The battery pack 146 (hereafter referred to as a battery 146) is charged from an AC/DC electrical power supply 101 at a normal time. In the case of a power outage, the battery 146 supplies an electrical power to the cache memory 143 and so on, and operates the cache memory 143. The battery controller 147 controls the charge and discharge for the battery 146.

The battery 146 can be exchanged without detaching the cache memory 143 and without stopping a power distribution from the AC/DC electrical power supply 101 to the memory package 140. More specifically, a repair and maintenance person can exchange the battery 146 by detaching the face plate 142 and opening the front face of the package 141.

The description will be continued with reference to FIG. 2. The CHA 110, the DKA 120, the microprocessor package 130, and the memory package 140 are coupled to each other. The circuits 110 to 140 that belong to one cluster are coupled to circuits of the same type that belong to the other cluster via a switch 150.

The management terminal 160 (hereafter referred to as an SVP 160) collects the information related to states of a variety of types for the storage control apparatus SC and displays the information on a terminal screen. Moreover, the SVP 160 transmits the collected information to an outside maintenance center 30 as the collected information stands or after the collected information is processed. A user or a repair and maintenance person can direct the storage control apparatus SC via the SVP 160. Based on the direction, the controller 100 executes a creation of a logical volume, a deletion of a logical volume, a corresponding of a logical volume to a communication port, and a setting of an access control for instance.

Although this is not shown in FIG. 2, wires that connect the circuits 110 to 140 to each other (communication paths) can also be made redundant.

The configuration of the drive chassis 20 will described in the following. The drive chassis 20 contains a plurality of storage apparatuses 210. The drive chassis 20 is provided with a disk unit 200 (hereafter referred to as a DKU 200) and an AC/DC electrical power supply 201 that supplies an electrical power to the DKU 200.

The DKU 200 is provided with a plurality of storage apparatuses 210 and a switch circuit 220 (hereafter referred to as an SSW 220). A first cluster and a second cluster are also set to the DKU 200, and the DKU 200 is provided with a redundant configuration. An electrical power is supplied to each of the clusters from a plurality of AC/DC electrical power supplies 201.

The SSW 220 is provided with a communication circuit (hereafter referred to as an expander) 221 that is configured to communicate with the storage apparatus 210 and so on. The expander 221 on the upstream side is coupled to the DKA 120 in the controller 100. The expander 221 on the downstream side is coupled to the expander 221 on the upstream side in the adjacent next DKU 200. For convenience of papers, only one DKU 200 is shown. However, a plurality of DKUs 200 is coupled to the controller 100 in a daisy chain mode.

As the storage apparatus 210, various types of devices capable of reading and writing data are available, for example, a hard disk device, a semiconductor memory device, an optical disk device, a magnetic-optical disk device, and others.

If a hard disk device is to be used as a storage apparatus, for example, an FC (Fibre Channel) disk, an SCSI (Small Computer System Interface) disk, an SATA disk, an ATA (AT Attachment) disk, an SAS (Serial Attached SCSI) disk, and others can be used. If a semiconductor memory device is to be used as a storage apparatus, various types of memory devices are available if possible, for example, a flash memory, an FeRAM (Ferroelectric Random Access Memory), an MRAM (Magnetoresistive Random Access Memory), a phase change memory (Ovonic Unified Memory), an RRAM (Resistance RAM), a PRAM (Phase change RAM), and others.

Figure 4:
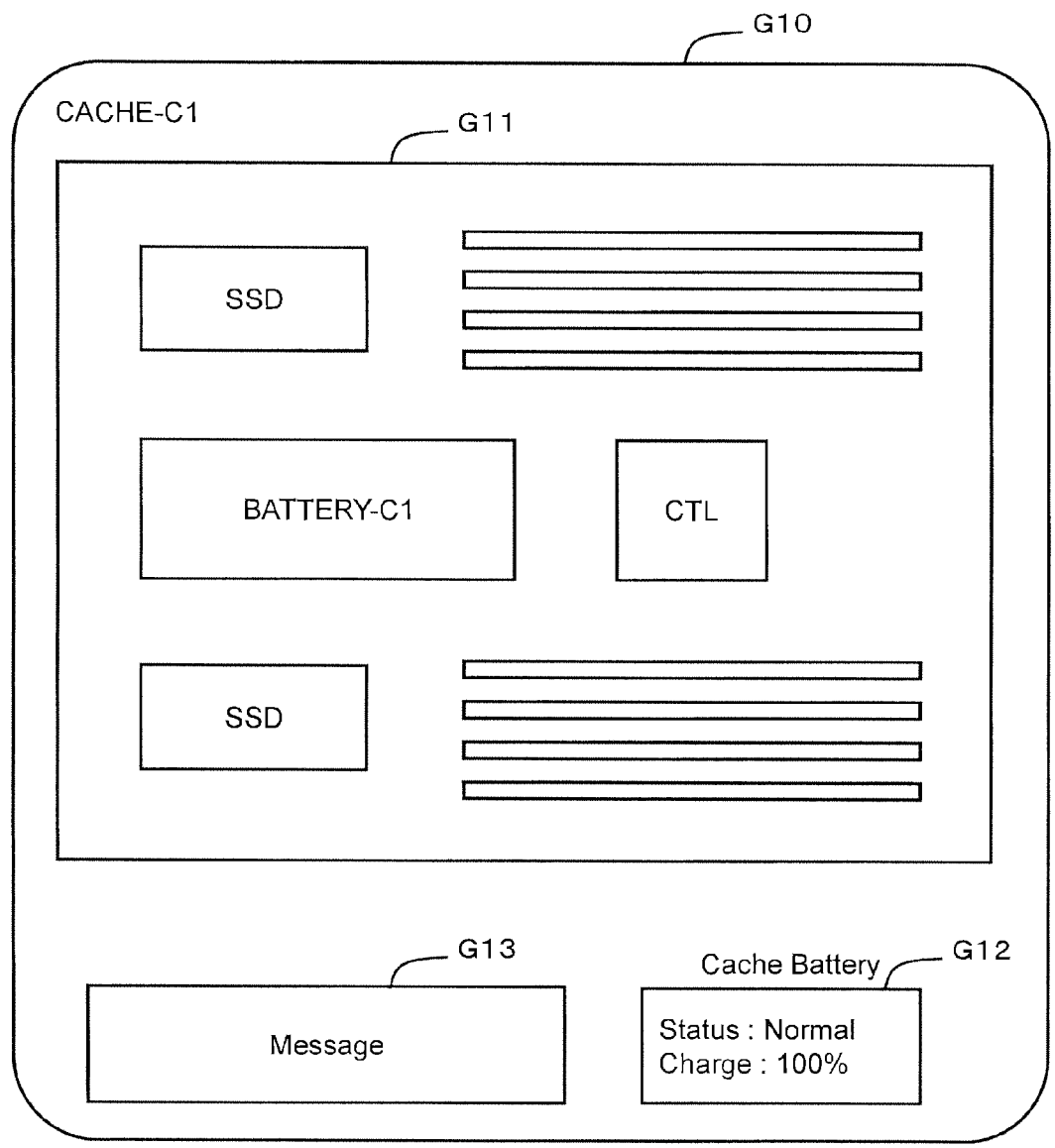
FIG. 4 is an explanatory diagram showing the configuration of a management display screen.

FIG. 4 shows an example of a management display screen G10 that is provided by the SVP 160. The management display screen G10 schematically indicates the configuration of the memory package 140. FIG. 4 shows the configuration and the status of the memory package 140 of the first cluster (C1).

The management display screen G10 is provided with a configuration display part G11 that schematically indicates the configuration of the memory package 140, a status display part G12 that indicates the status of the memory package 140, and a message display part G13.

A name of a selected operating mode and a remaining power level of the battery 146 are shown in the status display part G12. Messages such as an alarm message for issuing an alarm to a user and a guide message for prompting an operation of a user are shown in the message display part G13.

The points that indicate an occurrence of an event such as a failure, an exchange, an occurrence of an abnormality in the configuration display part G11 can be made blink on and off or can be displayed by a color different from that of other points in order to collect a user attention. By operating a switch button not shown, the configuration and the status of the memory package of the other cluster can be confirmed. Or more specifically, the configurations and the statuses of a plurality of memory packages that belong to a plurality of clusters can also be displayed in a view format.

Figure 5:
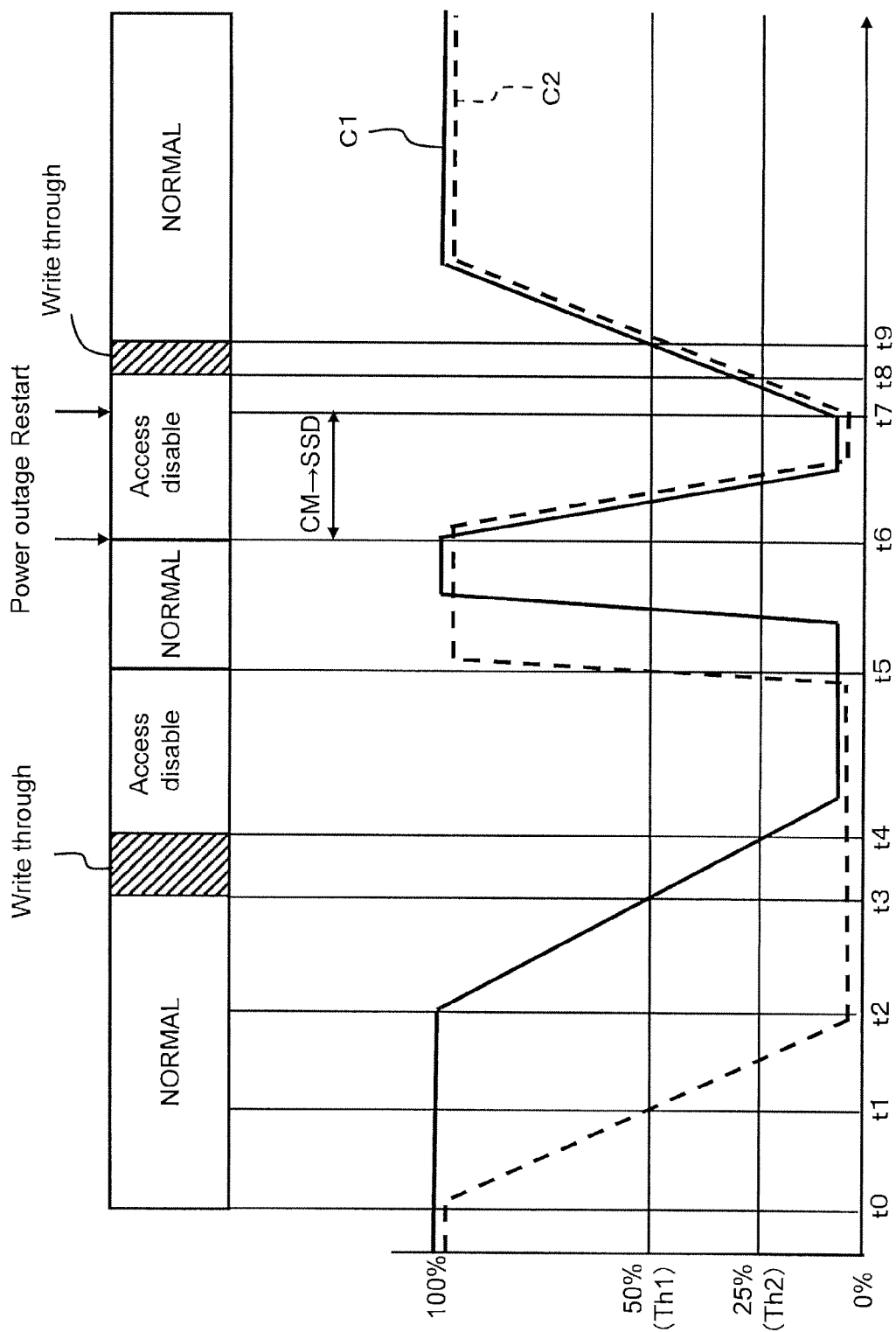
FIG. 5 is an explanatory diagram showing a relationship between a remaining power level of a battery and an operating mode.

FIG. 5 is an explanatory diagram showing a relationship between a variation of a remaining power level of the battery 146 that belongs to a cluster and an operating mode of the cache memory 143. Here, a first cluster (C1) and a second cluster (C2) are provided with one battery 146, respectively. A variation of a remaining power level of the battery 146 that belongs to the first cluster (C1) is indicated by a solid line. A variation of a remaining power level of the battery 146 that belongs to the second cluster (C2) is indicated by a dashed line. In the explanation of FIG. 5, the battery 146 that belongs to the first cluster (C1) is called a first battery, and the battery 146 that belongs to the second cluster (C2) is called a second battery.

Both of the first battery and the second battery is provided with a remaining power level of approximately 100% before a time of t0. The second battery is damaged at a time of t0. Since the second battery is damaged at a time of t0, a remaining power level of the second battery is decreased by slow degrees. At a time of t1, a remaining power level of the second battery reaches the first threshold value Th1.

The first threshold value Th1 is set as a value by which the user data and the management data that have been stored in the cache memory 143 can be saved to the flash memory device 144 for instance. As an amount of data that has been stored in the cache memory 143 is larger, a time that is required for completing a save to the flash memory device is longer. As a time that is required for a save is longer, a value of the first threshold value Th1 must be set larger.

As described later, a value of the first threshold value Th1 adjusted in accordance with the number of mounted cache memories 143. Here, since it is assumed that the maximum number of data caches of the cache memory 143 is mounted, the first threshold value Th1 is set as 50% for instance. In the case in which the number of mounted data caches is decreased, a value of the first threshold value Th1 is also decreased.

Moreover, a remaining power level of the second battery becomes below the second threshold value Th2 immediately before a time of t2, and comes closer to approximately 0 at a time of t2. The second threshold value Th2 is set as a value by which the management data that has been stored in the management data cache of the cache memory 143 can be saved to the flash memory device 144.

A value of the second threshold value Th2 depends on a size of the management data that is a save target to the flash memory device 144. Here, since it is assumed that the maximum number of management data caches of the cache memory 143 is mounted, the second threshold value Th2 is set as 25% for instance. In the case in which the number of mounted management data caches is decreased, a value of the second threshold value Th2 is also decreased.

The first battery is also damaged at a time of t2. A remaining power level of the first battery is decreased by slow degrees. At a time of t3, a remaining power level of the first battery reaches the first threshold value Th1. Both of a remaining power level of the first battery and a remaining power level of the second battery becomes below the first threshold value Th1 at a time of t3. However, a remaining power level of the first battery exceeds a remaining power level of the second battery at a time of t3.

At a time of t3, only a remaining power level of the first battery is equal to or larger than the second threshold value Th2 and is less than the first threshold value Th1. Since a remaining power level of the first battery is less than the first threshold value Th1, it is difficult to save all user data in the cache memory 143 to the flash memory device 144 by using an electrical power of the first battery.

However, a remaining power level of the first battery exceeds the second threshold value Th2. Consequently, the management data can be saved from the cache memory 143 to the flash memory device 144 by using an electrical power of the first battery. In the case in which the management data can be protected, a stored destination of the user data can be managed. At a time of t3, an operating mode of the cache memory is switched from a normal mode to a write through mode.

At a time of t4, a remaining power level of the first battery is decreased to be the second threshold value Th2. In the case in which a remaining power level of the first battery is less than the second threshold value Th2, there is a possibility that the management data in the cache memory 143 cannot be saved to the flash memory device 144. Consequently, at a time slightly after a time of t4, that is, at a time when a remaining power level of the first battery becomes less than the second threshold value Th2, an operating mode of the cache memory is switched from a write through mode to an access disable mode.

At a time (t3) when the write through mode is switched to, an alarm message is displayed on the screen of the management terminal 160, and an alarm is transmitted from the management terminal 160 to the maintenance center 30. From the maintenance center 30 that has received the alarm or from the nearest service deposit, a repair and maintenance person who has a new battery is dispatched to an installation site of the storage control apparatus SC.

At a time of t5, the second battery is exchanged to a new battery. Between a time of t5 and the next time of t6, the first battery is also exchanged to a new battery. Since the second battery is exchanged to a new battery in first, a remaining power level of the second battery is recovered to be 100%. An operating mode is switched from an access disable mode to a normal mode.

In the case in which a power outage occurs at a time of t6, the host is inhibited to access the storage control apparatus SC. In the case in which a power outage is detected, the data (the user data and the management data) that has been stored into the cache memory 143 is transferred to the flash memory device 144, and is stored into the flash memory device 144. During the power outage, an electrical power is not supplied from the AC/DC electrical power supply 101 to the battery 146, and an electrical power of the battery 146 is used for a data save. Consequently, a remaining power level of the first battery and a remaining power level of the second battery are decreased by slow degrees.

At a time of t7, a power outage is released and the storage control apparatus SC is restarted. At a time of t7, a remaining power level of the first battery and a remaining power level of the second battery are less than the second threshold value Th2. Consequently, the storage control apparatus SC is operated in an access disable mode. During that time, each of the batteries is charged.

At a time of t8, a remaining power level of each of the batteries reaches the second threshold value Th2. Consequently, an operating mode is switched from an access disable mode to a write through mode.

At a time of t9, a remaining power level of each of the batteries reaches the first threshold value Th1. Consequently, an operating mode is switched from a write through mode to a normal mode.

Figure 6:
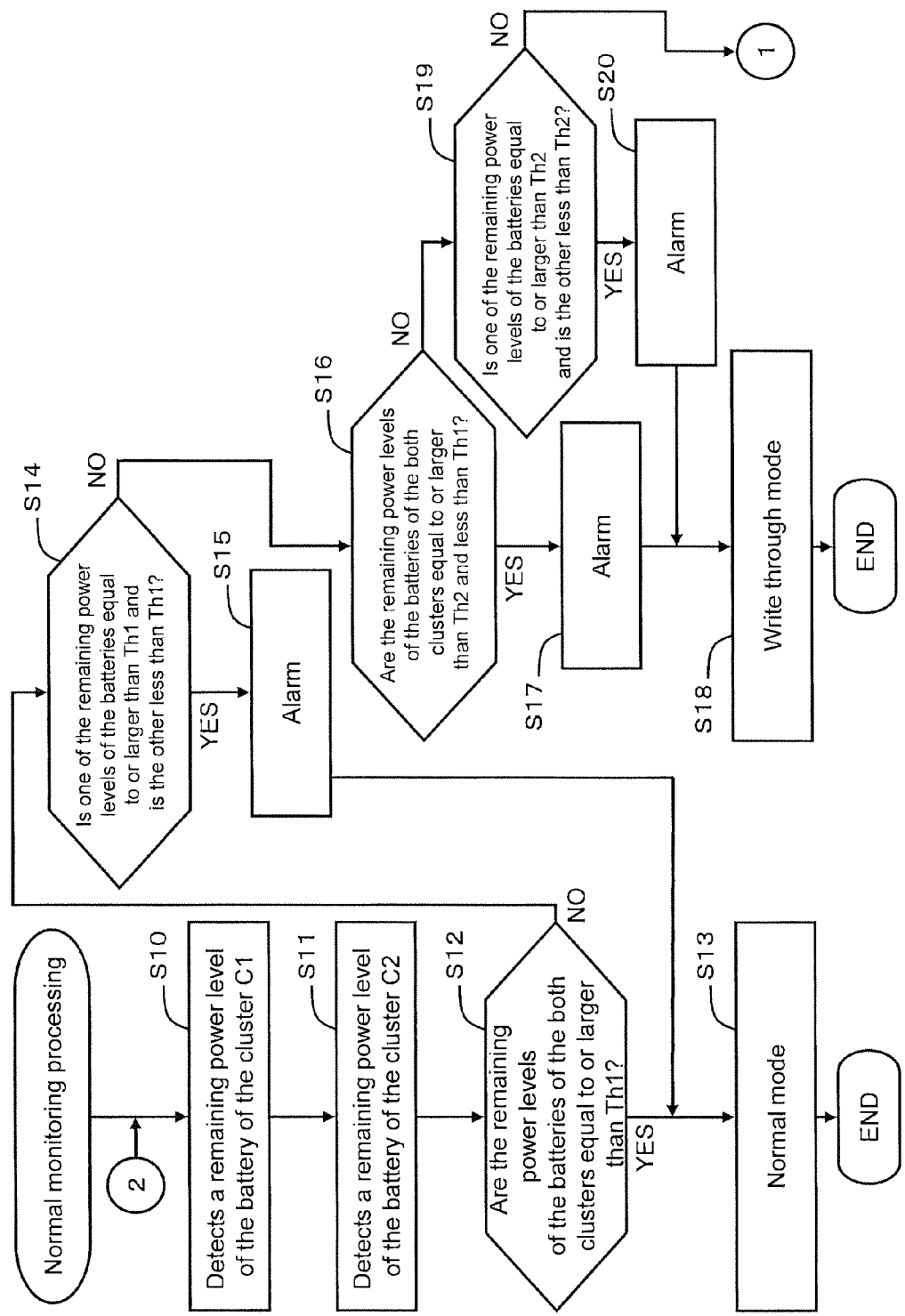
FIG. 6 is a flowchart showing a normal monitoring processing.
Figure 7:
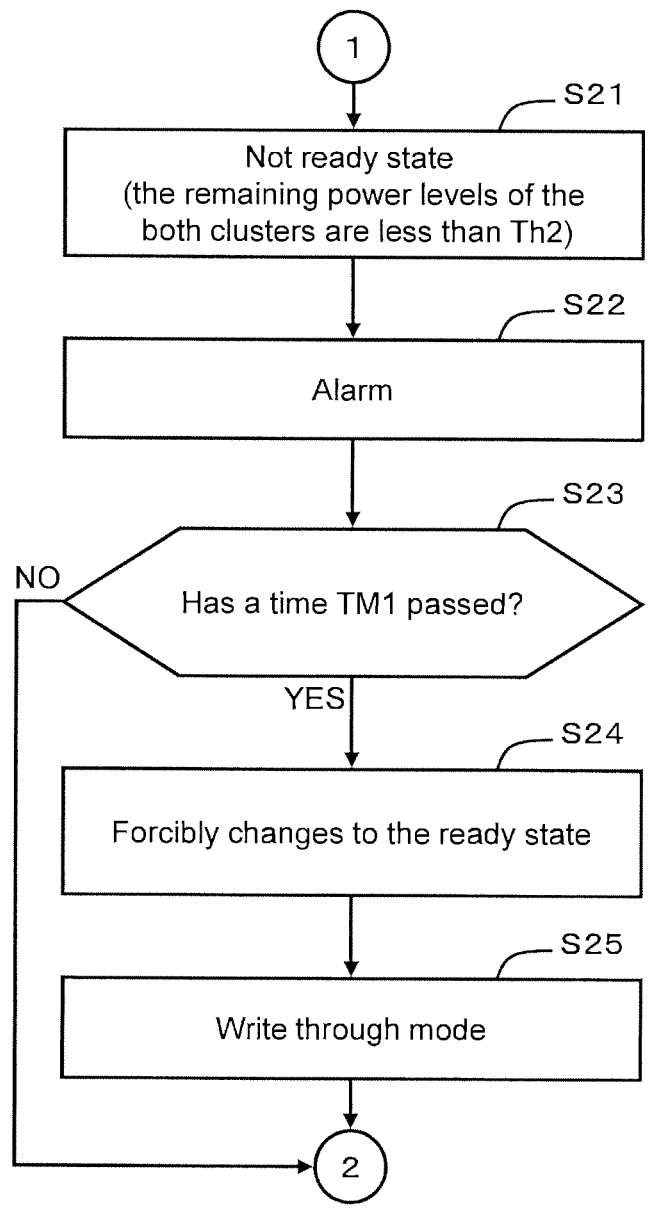
FIG. 7 is a flowchart showing a processing that follows the processing of FIG. 6.

FIGS. 6 and 7 are the flowcharts showing a normal monitoring processing. Each of the flowcharts that will be described in the following shows the overview of each processing, and might be different from the actual computer programs. What is called a person with an ordinary skill in the art may be able to alter or delete part of the steps shown in the figures or add new steps to the same.

The normal monitoring processing is a processing for monitoring a remaining power level of the battery 146 in each cluster at a normal time and for switching an operating mode for a data protection in accordance with the remaining power level. The present processing is executed for every cluster. The descriptions will be carried out in the following while setting the controller 100 as a subject.

The controller 100 detects a remaining power level of the first battery 146 that belongs to the first cluster C1 (S10), and then detects a remaining power level of the second battery 146 that belongs to the second cluster C2 (S11). The controller 100 can calculate a remaining power level (a storage capacity) of the battery 146 based on a charging voltage and a charging current to the battery 146 for instance.

The controller 100 judges whether or not a remaining power level of each of the batteries 146 is the first threshold value Th1 (S12). The S12 corresponds to a first judgment. In the case in which a remaining power level of the first battery is BL1 and a remaining power level of the second battery is BL2, the controller 100 judges whether or not the condition of "BL1 is equal to or larger than Th1 and BL2 is equal to or larger than Th1" is satisfied in the S12.

In the case in which the remaining power levels BL1 and BL2 of each of the batteries 146 is equal to or larger than the first threshold value Th1 (S12: YES), a normal mode is selected (S13). In the time chart of FIG. 5, a state before a time of t0 or a state after a time of t9 is corresponded to a state of the S13.

In the normal mode, the host is notified of a write processing completion at a point of time when the write data that has been received from the host is written to the cache memory 146. After that, the write data that has been stored in the cache memory 146 is written to a prescribed storage apparatus 210 while a prescribed timing is judged. Consequently, in the case in which a storage control apparatus SC is operated in the normal mode, the response performance and a usability of the storage control apparatus SC can be improved.

In the case in which at least one of the remaining power levels BL1 and BL2 of each of the batteries 146 is not equal to or larger than the first threshold value Th1 (S12: NO), the controller 100 judges whether or not one of the remaining power levels BL1 and BL2 of each of the batteries 146 is equal to or larger than the first threshold value Th1 and the other of the remaining power levels BL1 and BL2 of each of the batteries 146 is less than the first threshold value Th1 (S14). The S14 corresponds to a second judgment. In other words, the controller 100 judges whether or not the condition of "BL1 is equal to or larger than Th1 and BL2 is less than Th1" or the condition of "BL2 is equal to or larger than Th1 and BL1 is less than Th1" is satisfied.

In the case in which one of the remaining power levels BL1 and BL2 of each of the batteries 146 is equal to or larger than the first threshold value Th1 and the other of the remaining power levels BL1 and BL2 of each of the batteries 146 is less than the first threshold value Th1 (S14: YES), the controller 100 issues an alarm that there is a battery of which a remaining power level is less than the first threshold value Th1 via a management terminal 160 (S15). This alarm is displayed on a terminal screen of the management terminal 160, and is transmitted to the maintenance center 30.

After issuing an alarm, the controller 100 selects a normal mode (S13). This is because the data that has been stored in the cache memory 143 can be saved to the flash memory device 144 even if a power outage occurs since one of the remaining power levels BL1 and BL2 of each of the batteries 146 is equal to or larger than the first threshold value Th1. A state to the S13 via the S14 and the S15 corresponds to a state from a time of t0 to a time of t3 and a state from a time of 5 to a middle point between a time of t5 and a time of t6 in FIG. 5.

In the case in which a judgment of the S14 is determined as "NO", the controller 100 judges whether or not the remaining power levels BL1 and BL2 of each of the batteries 146 are equal to or larger than the second threshold value Th2 and the remaining power levels BL1 and BL2 of each of the batteries 146 are less than the first threshold value Th1 (S16). The S16 corresponds to a third judgment.

In the case in which the condition of "BL1 is equal to or larger than Th2 and BL2 is less than Th1" is satisfied (S16: YES), the controller 100 issues an alarm that the remaining power levels BL1 and BL2 of each of the batteries 146 are equal to or larger than the second threshold value Th2 and the remaining power levels BL1 and BL2 of each of the batteries 146 are less than the first threshold value Th1 (S17). This alarm is transmitted to the maintenance center 30 via the management terminal 160. After issuing an alarm, the controller 100 selects a write through mode (S18). A state to the S18 via the S16 corresponds to a state from a time of t8 to a time of t9 in FIG. 5.

In the case in which a judgment of the S16 is determined as "NO", the controller 100 judges whether or not one of the remaining power levels BL1 and BL2 of each of the batteries 146 is equal to or larger than the second threshold value Th2 and the other of the remaining power levels BL1 and BL2 of each of the batteries 146 is less than the second threshold value Th2 (S19). The S19 corresponds to a fourth judgment.

In the case in which one of the remaining power levels BL1 and BL2 of each of the batteries 146 is equal to or larger than the second threshold value Th2 and the other of the remaining power levels BL1 and BL2 of each of the batteries 146 is less than the second threshold value Th2 (S19: YES), the controller 100 issues an alarm (S20) and selects a write through mode (S18). The alarm includes a message that indicates that one of the remaining power levels BL1 and BL2 of each of the batteries 146 is equal to or larger than the second threshold value Th2 and the other of the remaining power levels BL1 and BL2 of each of the batteries 146 is less than the second threshold value Th2. A state to the S18 via the S19 and the S20 corresponds to a state from a time of t3 to a time of t4 in FIG. 5.

In the case in which a judgment of the S19 is determined as "NO", the processing is transferred to a flowchart shown in FIG. 7. The controller 100 sets the storage control apparatus SC in a not ready state (S21) and issues an alarm (S22). The alarm includes a message that indicates that both of the remaining power levels BL1 and BL2 of each of the batteries 146 is less than the second threshold value Th2. The not ready state is a state in which the storage control apparatus SC is not ready and cannot receive a command from a host.

The controller 100 judges whether or not a prescribed time TM1 passes after the storage control apparatus SC is set to be in the not ready state (S23). In the case in which a prescribed time TM1 does not pass (S23: NO), the processing is returned to the S10 shown in FIG. 6.

In the case in which at least one of the remaining power levels BL1 and BL2 of each of the batteries 146 is recovered before the time when a prescribed time TM1 passes, the not ready state is released and a setting is changed to a normal mode or a write through mode. Although this is not shown in FIG. 6, in the case in which the remaining power level of the batteries 146 is recovered after the not ready state is set and in the case in which any one of the above first to third judgments is corresponded, the not ready state is transferred to the ready state and a setting is changed to any one of a normal mode and a write through mode.

In the case in which the remaining power levels BL1 and BL2 of each of the batteries 146 are less than the second threshold value Th2 even if a prescribed time TM1 passes (S19: NO), the controller 100 forcibly changes the not ready state to the ready state (S24) and selects a write through mode (S25).

In the case in which the matters are not improved even if a prescribed time TM1 passes, an operation of the storage control apparatus SC is started in consideration of a comparison of a possibility of a data loss caused by an occurrence of a power outage with an inconvenience caused by a service suspension for a long period of time. By this, a priority is placed on a convenience of a user.

Figure 8:
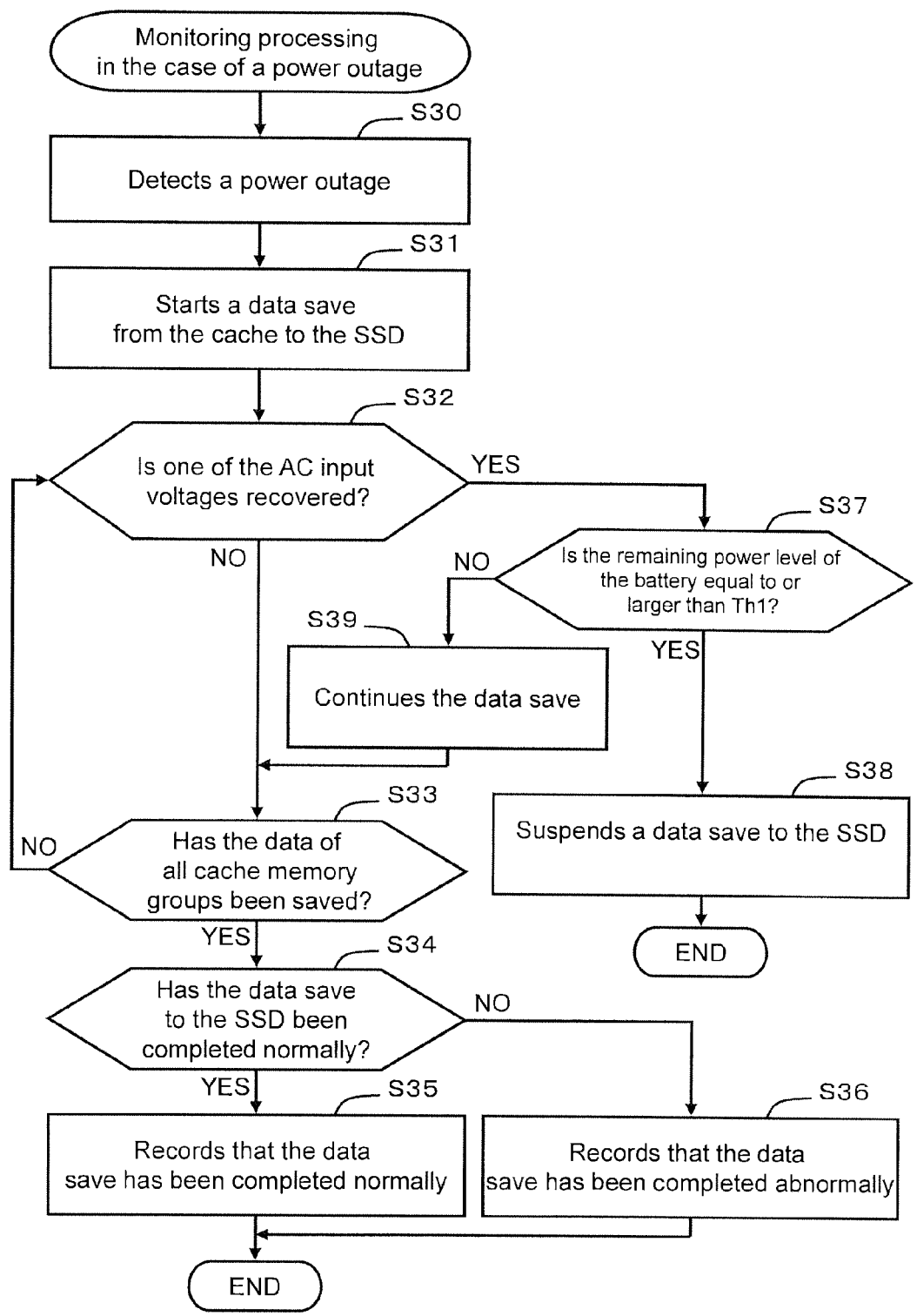
FIG. 8 is a flowchart showing a monitoring processing in the case of a power outage.

FIG. 8 is a flowchart showing a monitoring processing in the case of a power outage. The present processing is executed for every cluster.

The controller 100 monitors each of the AC voltages that are input to each of the redundant AC/DC electrical power supplies 101. In the case in which each of the AC voltages that are input to each of the redundant AC/DC electrical power supplies 101 is decreased to be approximately 0 volt at the same time, the controller 100 can detect a power outage (S30).

The controller 100 starts a data save from the cache memory 143 to the flash memory device 144 (S31). After starting the data save, the controller 100 judges whether or not at least one of the AC voltages that are input to each of the redundant AC/DC electrical power supplies 101 is recovered (S32). In other words, the controller 100 judges whether or not a power outage is released. However, being prepared for the case in which one of the AC/DC electrical power supplies 101 is damaged, the controller 100 judges whether or not one of the AC/DC electrical power supplies 101 is recovered in the S32.

In the case of a power outage (S32: NO), the controller 100 judges whether or not the data of a cache memory group has been saved (S33). The cache memory group is a group of one set composed of two pieces for instance. In the present embodiment, the data is saved from the cache memory to the flash memory device in a group unit.

In the case in which the data save of all cache memory groups is completed before a power outage is released (S33: YES), the controller 100 judges whether or not the data save to the flash memory device 144 is completed normally (S34).

In the case in which the data save (the data transfer) from the cache memory 143 to the flash memory device 144 is completed normally (S34: YES), the controller 100 stores that the data save has been completed normally (S35). For instance, a result of the data save is stored into a local memory in the microprocessor package 130.

In the case in which the data save (the data transfer) from the cache memory 143 to the flash memory device 144 is not completed normally (S34: NO), the controller 100 stores that the data save has been completed abnormally (S36).

In the case in which at least one of the AC voltages that are input to each of the redundant AC/DC electrical power supplies 101 is recovered during a data save (S32: YES), the controller 100 judges whether or not the remaining power level of the battery is equal to or larger than the first threshold value Th1 (S37), In the case in which the remaining power level of the battery is equal to or larger than the first threshold value Th1 (S37: YES), the controller 100 suspends a data save from the cache memory 143 to the flash memory device 144 (S38). This is because a power outage is released and the battery 146 has a sufficient remaining power level. In this case, even if a power outage occurs again, the data of the cache memory 143 can be saved to the flash memory device 144 by using an electrical power of the battery 146. Consequently, the data save that has been started in the S31 I stopped.

On the other hand, in the case in which at least one of the AC voltages that are input to each of the redundant AC/DC electrical power supplies 101 is recovered and the remaining power level of the battery is less than the first threshold value Th1, the controller 100 continues the data save (the data transfer) from the cache memory 143 to the flash memory device 144 (S39) and transfers to the S33. Even in the case in which a power outage is released, if the remaining power level of the battery is less than the first threshold value Th1, there is a possibility that the data of the cache memory 143 cannot be saved safely to the flash memory device 144 when a power outage occurs again. In the present processing, even if a power outage is released, in the case in which the battery 146 is not charged, the data save is continued in order to ensure the safety of the data.

Figure 9:
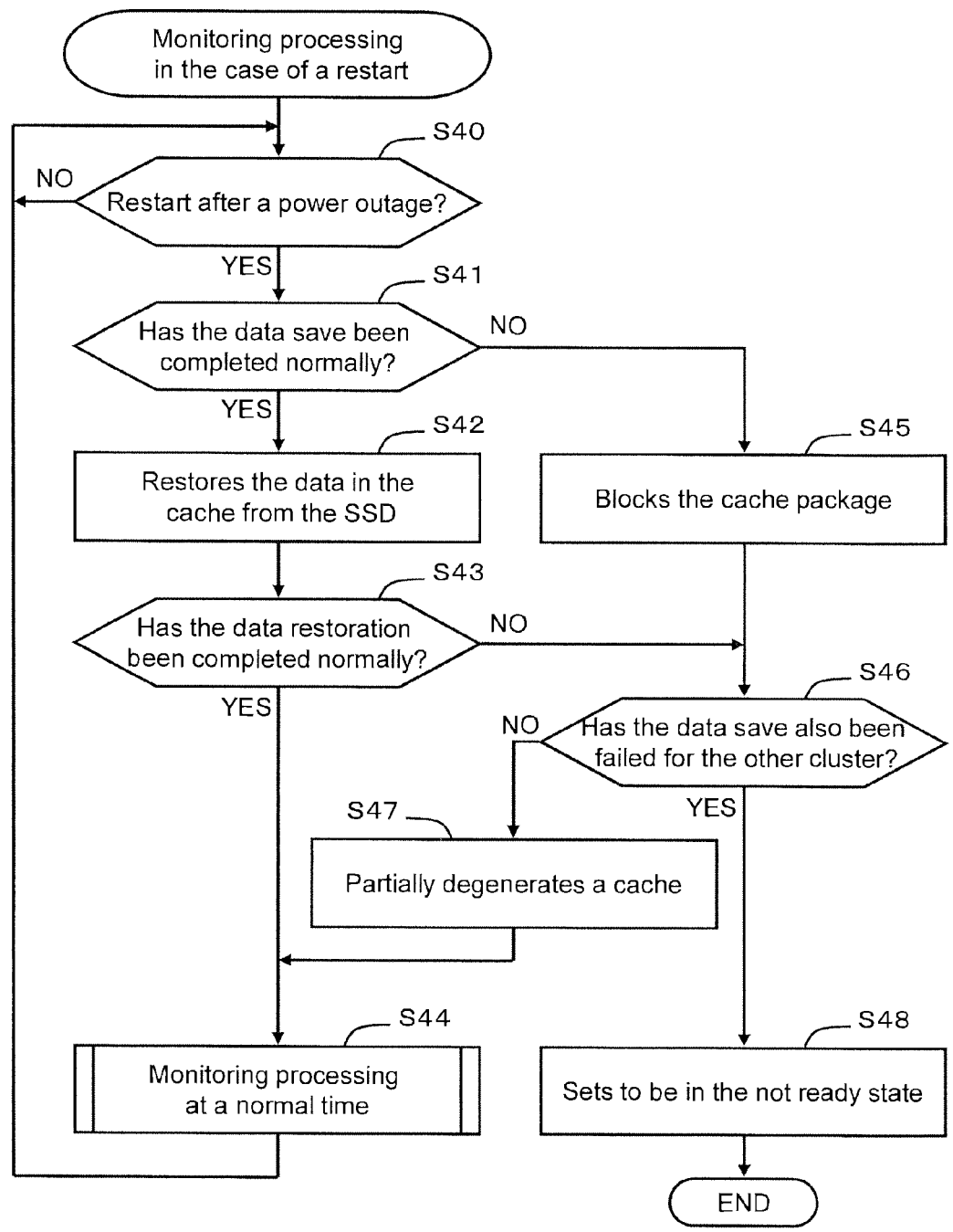
FIG. 9 is a flowchart showing a monitoring processing at a restart after the case of a power outage.

FIG. 9 is a flowchart showing a monitoring processing in the case in which the storage control apparatus SC is restarted after a power outage is released. The present processing is executed for every cluster. The controller 100 judges whether or not the storage control apparatus SC is restarted after a power outage is released (S40).

The controller 100 judges whether or not the data of the cache memory 143 has been normally saved to the flash memory device 144 by the monitoring processing in the case of a power outage which has been described in FIG. 8 (S41).

In the case in which the data of the cache memory 143 has been normally saved to the flash memory device 144 (S41:

YES), the controller 100 transfers the data that has been saved to the flash memory device 144 to the cache memory 143 and restores the data of the cache memory 143 (S42).

The controller 100 judges whether or not the data restoration has been normally completed (S43). In the case in which the data restoration has been normally completed (S43: YES), the controller 100 executes a monitoring processing at a normal time which has been described in FIGS. 6 and 7 (S44). In the case in which the data restoration has not been normally completed (S43: NO), the processing is transferred to the S46 described later.

In the case in which the data save (the data transfer) from the cache memory 143 to the flash memory device 144 has not been completed normally (S41: NO), the controller 100 blocks the memory package 140 (S45). Since a state of the data of the cache memory 143 cannot be returned to a state before the power outage, a usage of the cache memory 143 is inhibited.

The controller 100 judges whether or not the data save has also been failed for the memory package 140 of the other cluster (S46). In the case in which the data save has been successful for the memory package 140 of the other cluster (S46: NO), the controller 100 blocks only the memory package 140 in the target cluster (S47), and the processing is transferred to the S44. The state in which only the memory package 140 of one cluster is blocked and the memory package 140 of the other cluster is normally operated is represented as "partially degenerates a cache" in the S47.

In the case in which any one of the data save and the data restoration has also been failed for the memory package 140 of the other cluster (S46: YES), the controller 100 sets the storage control apparatus SC to be in the not ready state (S48). Since the data of the cache memory 143 cannot be restored for the both clusters, an operation of the storage control apparatus SC cannot be continued. Consequently, the controller 100 sets the storage control apparatus SC to be in the not ready state.

Figure 10:
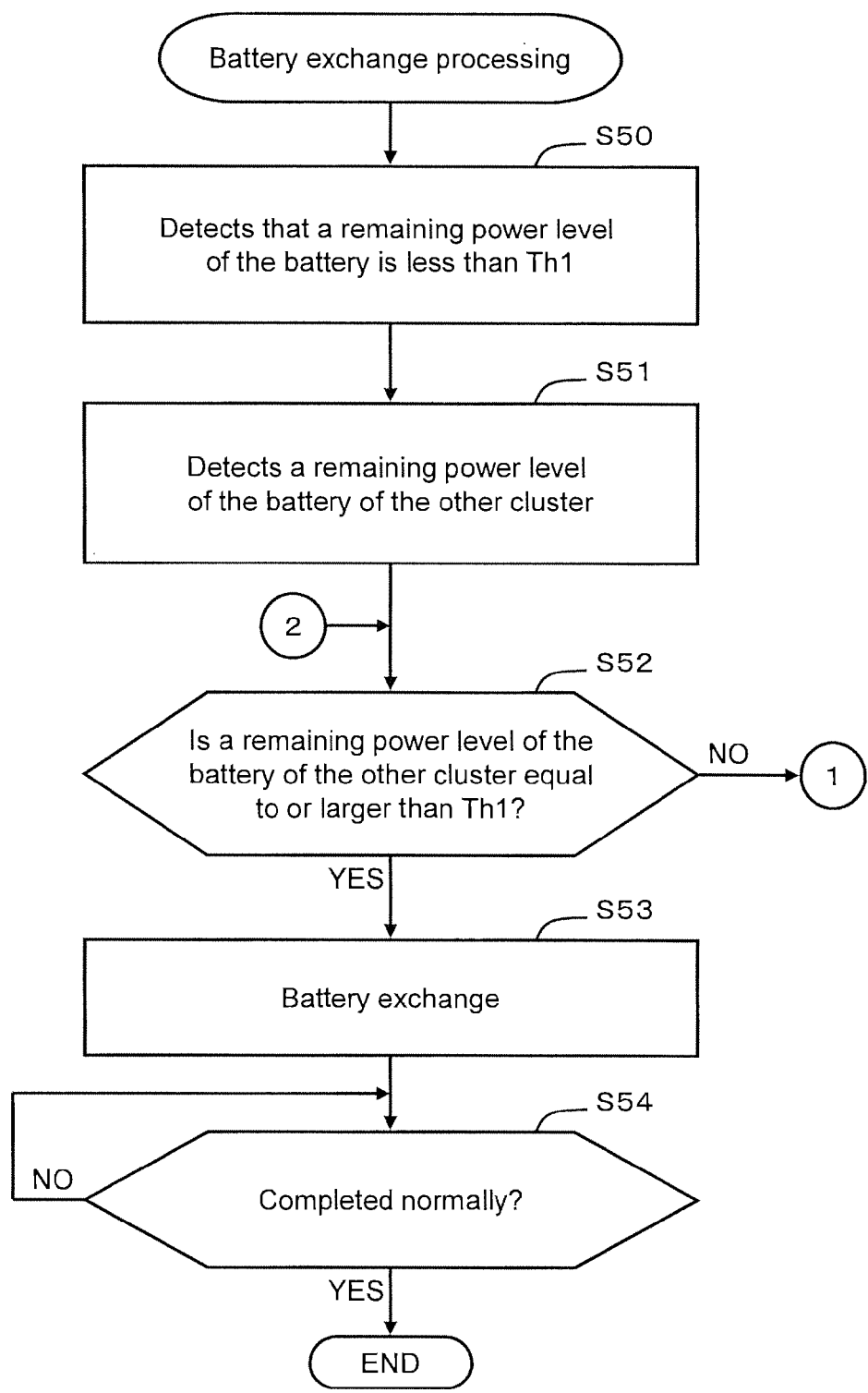
FIG. 10 is a flowchart showing a processing in the case of a battery exchange.
Figure 11:
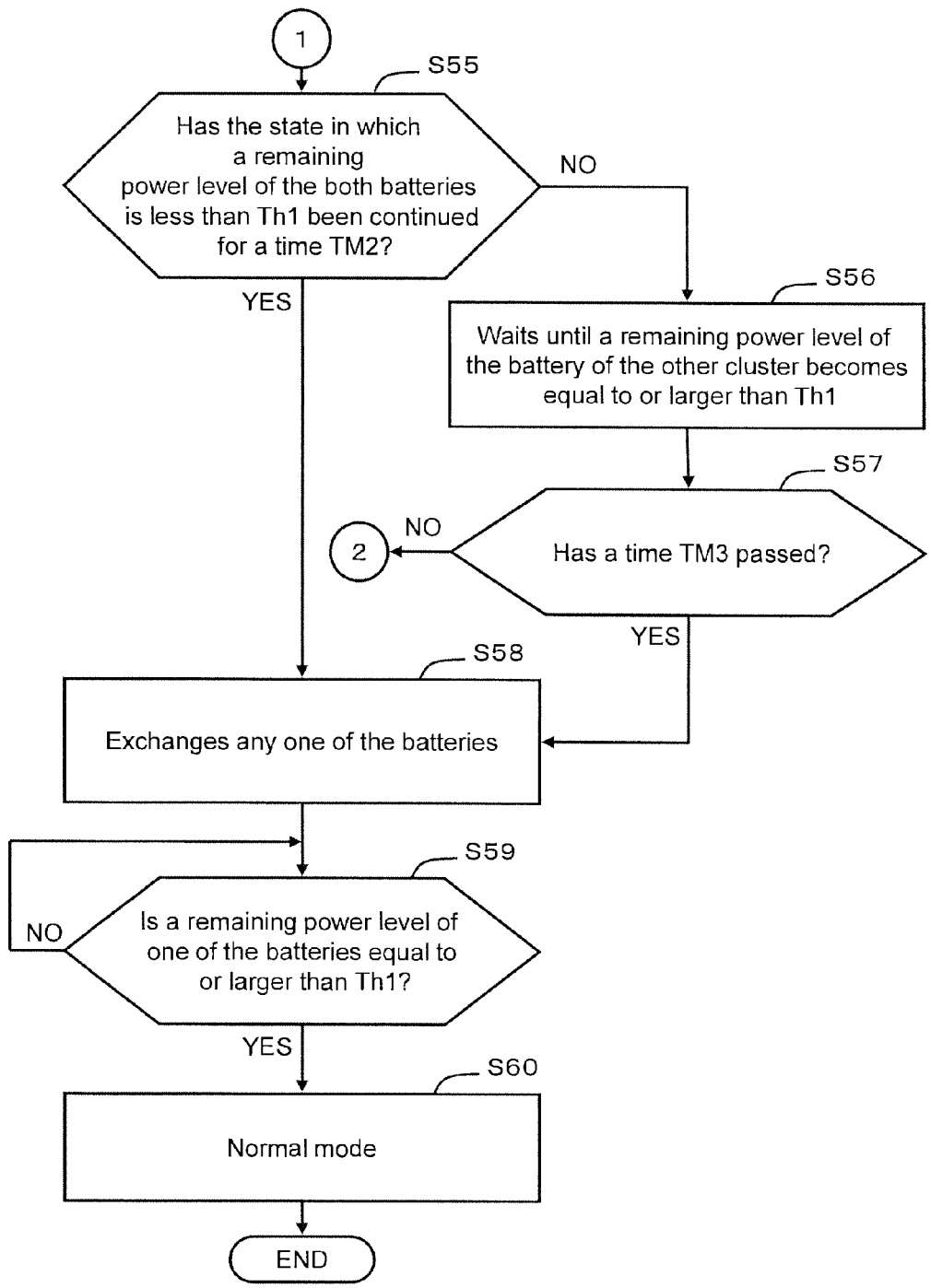
FIG. 11 is a flowchart showing a processing that follows the processing of FIG. 10.

FIG. 10 and FIG. 11 are the flowcharts showing a processing in the case of a battery exchange. The present processing is executed for the cluster in which the battery 146 is exchanged. At least a part of the present processing can be carried out by a repair and maintenance person or a user.

The controller 100 detects a remaining power level of the battery 146 of an exchange target is less than the first threshold value Th1 (S50), and calculates a remaining power level of the battery that belongs to the other cluster (S51). The controller 100 judges whether or not a remaining power level of the battery that belongs to the other cluster is equal to or larger than the first threshold value Th1 (S52). In the case in which a remaining power level of the battery that belongs to the other cluster is equal to or larger than the first threshold value Th1 (S52: YES), the controller 100 permits a battery exchange (S53) and judges whether or not the battery exchange has been normally completed (S54).

The processing of the S52 to the S54 can also be carried out by a repair and maintenance person or a user. The repair and maintenance person or a user can confirm a remaining power level of the battery that belongs to each of the clusters via a management display screen G10 that is displayed on the management terminal 160 for instance. After the repair and maintenance person or a user confirms that a remaining power level of the other battery (a battery that is not an exchange target) is equal to or larger than the first threshold value Th1 on the management display screen G10 (S52: YES), the repair and maintenance person or a user exchanges the battery 146 that is an exchange target to a new battery (S53 and S54).

In the case in which a remaining power level of the battery 146 that belongs to the other cluster that is not an exchange target is not equal to or larger than the first threshold value Th1 (S52: NO), the processing is transferred to the flowchart shown in FIG. 11. The controller 100 judges whether or not the state in which a remaining power level of the battery 146 is less than the first threshold value Th1 has been continued for a prescribed period of time TM2 or more (S55).

In the case in which a remaining power level of each of the batteries is less than the first threshold value Th1, since "YES" is determined in the S16 shown in FIG. 6, a write through mode is set.

In the case in which the state in which a remaining power level of the battery 146 is less than the first threshold value Th1 has not been continued for a prescribed period of time TM2 or more (S55: NO), the controller 100 waits until a remaining power level of the battery 146 that belongs to the other cluster becomes equal to or larger than the first threshold value Th1 (S56).

The controller 100 judges whether or not other prescribed time TM3 has passed (S57). The other prescribed time TM3 is set as a time that is considered to be sufficient for recovering a remaining power level of the battery 146 to be equal to or larger than the first threshold value Th1. The value of the prescribed time TM3 can also be set to be equal to or different from a value of the prescribed time TM1 shown in the S23 of FIG. 7.

In the case in which the other prescribed time TM3 has not passed (S57: NO), the S52 is returned. Consequently, S52, S55, S56, and S57 are repeatedly executed until the other prescribed time TM3 passes.

In the case in which a remaining power level of the other battery 146 does not become equal to or larger than the first threshold value Th1 even if the other prescribed time TM3 passes (S57: YES), the controller 100 permits an exchange of any one of the batteries 146 (S58). This is because there is a low possibility of recovering a remaining power level of the battery even if the controller 100 waits for more time. Consequently, the controller 100 permits an exchange of the battery in order to recover the safety of a data protection earlier.

In the case in which the state in which a remaining power level of the battery 146 is less than the first threshold value Th1 is continued for a prescribed period of time TM2 or more (S55: YES), the controller 100 also permits an exchange of any one of the batteries 146 (S58).

The controller 100 judges whether or not a remaining power level of one of the batteries 146 becomes equal to or larger than the first threshold value Th1 (S59). In the case in which an exchange of the battery in the S58 is normally completed, a remaining power level of the exchanged battery 146 is equal to or larger than the first threshold value Th1 (S59: YES). The controller 100 then switches a write through mode to a normal mode (S60).

A part of the flowchart that is shown in FIG. 11 can be carried out by a repair and maintenance person or a user. For instance, a repair and maintenance person or a user can carry out S55, S56, S57, and S58.

Figure 12:
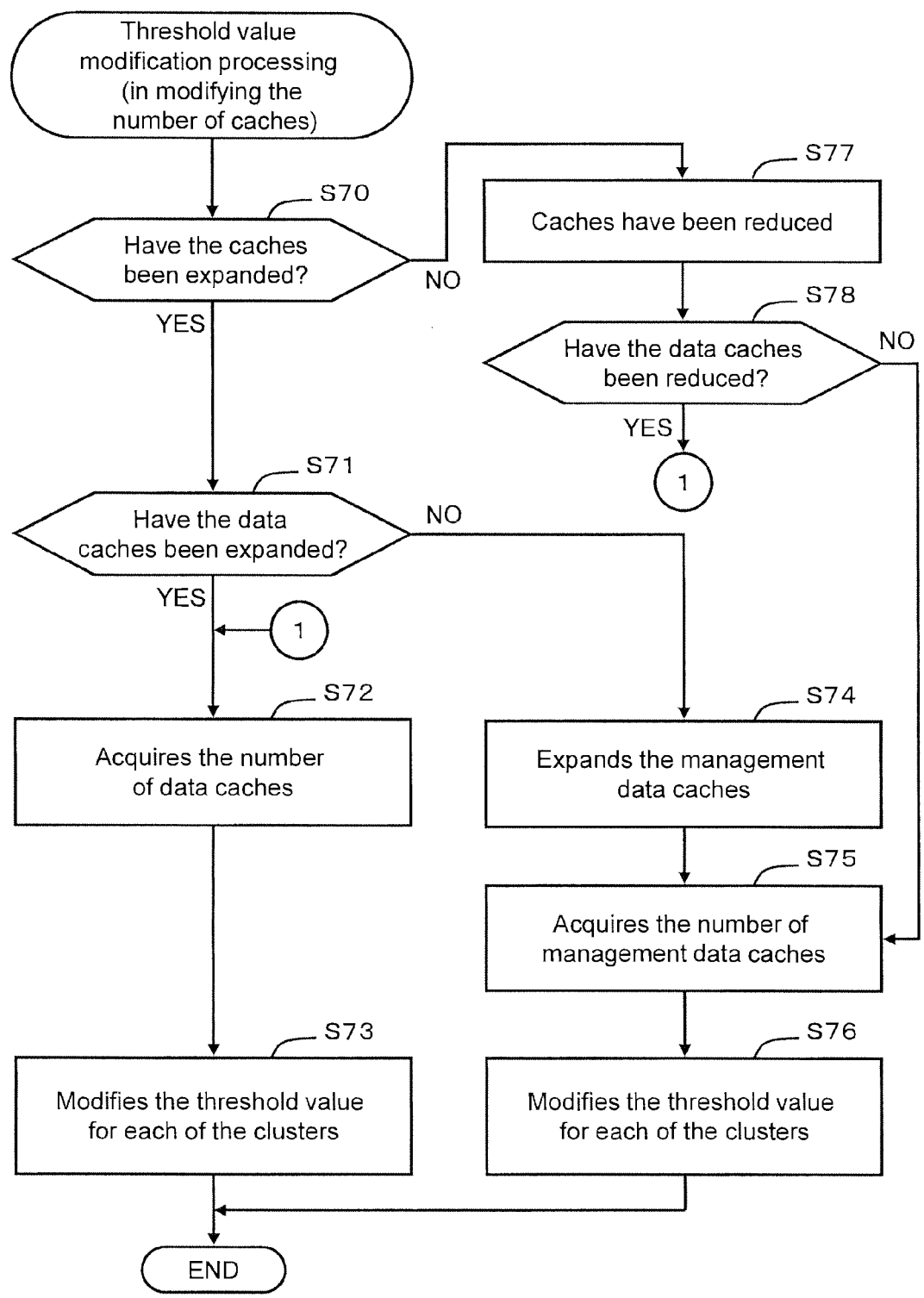
FIG. 12 is a flowchart showing a processing for modifying a threshold value in accordance with the number of memories.

FIG. 12 is a flowchart showing a processing for modifying a threshold value in accordance with the number of the mounted cache memories 143. The controller 100 judges whether or not the cache memories 143 in the memory package 140 have been expanded (S70). In the case in which the cache memories 143 in the memory package 140 have been expanded (S70: YES), the controller 100 judges whether or not the data caches have been expanded (S71).

In the case in which the data caches have been expanded (S71: YES), the controller 100 acquires the number of data caches that are mounted on the memory package 140 (S72), and modifies the first threshold value (Th1) for monitoring a remaining power level of each of the clusters (S73).

In the case in which the data caches have not been expanded (S71: NO), the management data caches have been expanded (S74). In that case, the controller 100 acquires the number of management data caches that are mounted on the memory package 140 (S75), and modifies the second threshold value (Th2) for monitoring a remaining power level of each of the clusters (S76).

FIG. 13 shows the tables T10A and T10B that are configured to manage the initial values of the first threshold value Th1 and the second threshold value Th2. As shown in FIG. 13(*a*), the table T10A that is configured to manage the initial value of the first threshold value Th1 is provided with a cluster number column C10A and an initial threshold value column C11A. In the cluster number column C10A, the numbers for identifying a first cluster and a second cluster are set. In the initial threshold value column C11A, the initial value of the first threshold value for each cluster is set. The initial value of the first threshold value for each cluster is set as Th1.

As shown in FIG. 13(*b*), the table T10B that is configured to manage the initial value of the second threshold value Th2 is provided with a cluster number column C10B and an initial value threshold value column C11B. As the initial value of the second threshold value for each cluster, Th2 is set.

FIG. 14 shows the tables T20A and T20B that are configured to modify a threshold value in accordance with the number of the mounted cache memories 143. As shown in FIG. 14(*a*), the first threshold value modification table T20A is provided with a data cache number column C20A and a first threshold value column C21A.

In the present embodiment, in the case in which the data caches of the maximum number of data caches that can be mounted are mounted, it is set that the first threshold value is the maximum value Th1. The maximum value Th1 is equal to an initial value. In other words, in the present embodiment, an initial value of the first threshold value is set to be a maximum value. The table T20A is configured in such a manner that a value of the first threshold value becomes lower as the number of data caches becomes less.

In the case in which the number of mounted data caches is eight that is an upper limit value for instance, the first threshold value is set to be Th1 (for instance, 50%). In the case in which the number of mounted data caches is six for instance, the first threshold value is set to be Th1*c* (for instance, 45%). In the case in which the number of mounted data caches is four for instance, the first threshold value is set to be Th1*b* (for instance, 40%). In the case in which the number of mounted data caches is two that is a lower limit value for instance, the first threshold value is set to be Th1*a* (for instance, 35%).

As shown in FIG. 14(*b*), the second threshold value modification table T20B is provided with a management data cache number column C20B and a second threshold value column C21B.

In the present embodiment, in the case in which the number of mounted management data caches is four that is an upper limit value for instance, the second threshold value is set to be Th2 (for instance, 25%). The Th2 is an initial value of the second threshold value and is a maximum value. In the case in which the number of mounted management data caches is two that is a lower limit value for instance, the second threshold value is set to be Th2*a* (for instance, 20%). As described above, an initial value of the management data cache is set to be Th2 that is a maximum value. The table T20B is configured in such a manner that a value of the second threshold value becomes lower as the number of management data caches becomes less.

Figure 15:
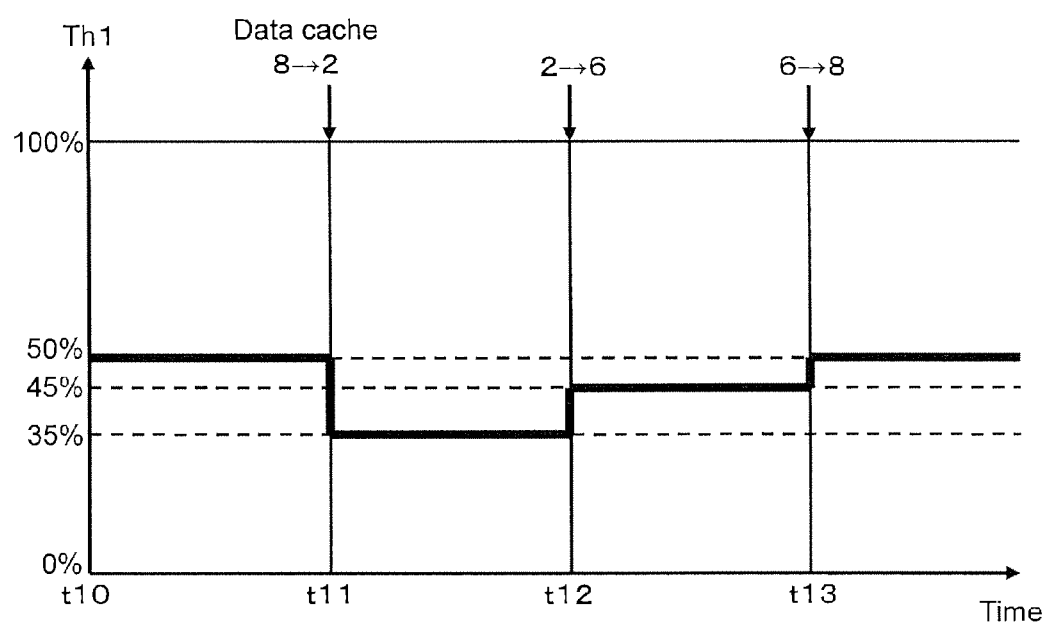
FIG. 15 is an explanatory diagram showing a state in which a threshold value is modified in accordance with the number of memories.

FIG. 15 is a time chart showing a state in which a first threshold value is modified in accordance with a variation of the number of mounted data caches.

At a time of t10, since the data caches of three that is an upper limit value are mounted, the first threshold value is set to be Th1 (50%). At a time of t11, in the case in which the number of data caches is decreased from eight that is an upper limit value to two that is a lower limit value, the first threshold value is decreased from Th1 to Th1*a* (35%). At a time of t12, in the case in which the number of data caches is increased from two to six, the first threshold value is increased from Th1*a* to Th1*c* (45%). At a time of t13, in the case in which the number of data caches is increased from six to eight, the first threshold value is increased from Th1*c* to Th1.

As described in FIG. 12 to FIG. 15, in the present embodiment, the first threshold value and the second threshold value are adjusted in accordance with the number of mounted cache memories 143. In the present embodiment, in the case in which the number of mounted data caches is increased or decreased, the first threshold value is modified in accordance with the increase and decrease (S73). Similarly in the present embodiment, in the case in which the number of mounted management data caches is increased or decreased, the second threshold value is modified in accordance with the increase and decrease (S76).

Figure 16:
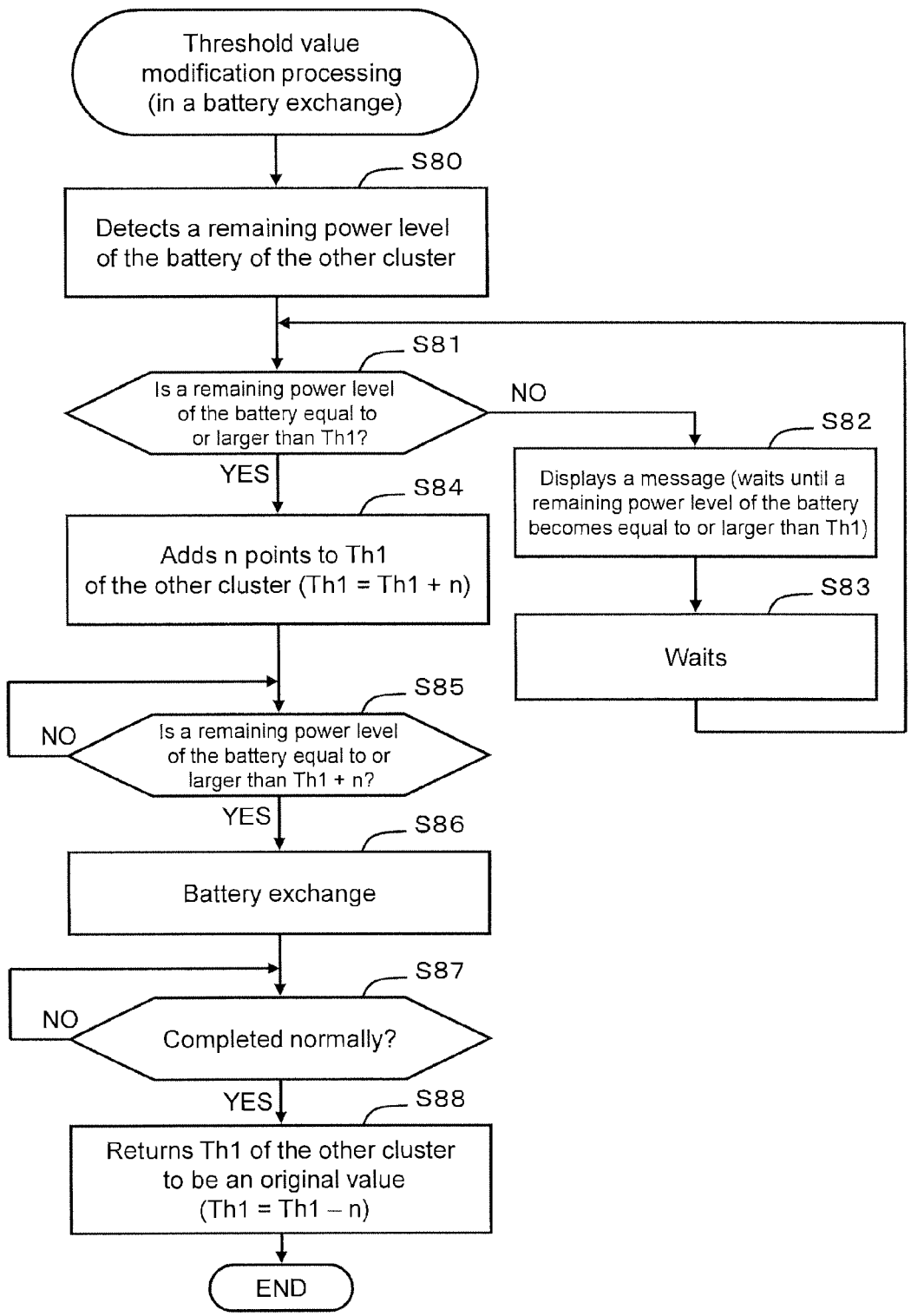
FIG. 16 is a flowchart showing a processing for modifying a threshold value in the case of a battery exchange.

FIG. 16 is a flowchart showing a processing for modifying a threshold value in the case of a battery exchange. The controller 100 calculates a remaining power level of the battery that belongs to the other cluster that is not a cluster of a battery exchange target (S80).

The controller 100 judges whether or not a remaining power level of the other battery 146 is equal to or larger than the first threshold value Th1 (S81). In the case in which a remaining power level of the other battery 146 is less than the first threshold value Th1 (S81: NO), the controller 100 displays a message to start a battery exchange operation when a remaining power level of the other battery 146 becomes equal to or larger than the first threshold value Th1 on the screen of the management terminal 160 (S82). The controller 100 waits a recovery of a remaining power level of the other battery 146 (S83).

In the case in which a remaining power level of the other battery 146 becomes equal to or larger than the first threshold value Th1 (S81: YES), the controller 100 adds a prescribed value n to the first threshold value Th1 related to the other battery (S84). For instance, in the case in which a prescribed value n is 10% and the first threshold value Th1 related to the other battery is 50%, the controller 100 modifies the first threshold value Th1 related to the other battery to be 60% (50%+10%=60%).

The controller 100 judges whether or not a remaining power level of the other battery 146 is equal to or larger than Th1+n (S85). In the case in which a remaining power level of the other battery 146 is equal to or larger than Th1+n (S85: YES), the controller 100 displays a message to permit a battery exchange operation on the screen of the management terminal 160 (S86). In the case in which a repair and maintenance person or a user confirms the message, the repair and maintenance person or the user exchanges the battery 146.

In the case in which the battery exchange operation has been completed normally (S87: YES), the controller 100 modifies the first threshold value related to the other battery from Th1+n to Th1 (S88).

As described above, in the case in which the battery 146 of the other cluster is exchanged, the first threshold value Th1 for monitoring the battery of the other cluster is increased by the prescribed value n (S84) and a monitoring level is increased. Consequently, since a remaining power level of the other battery has some more room as compared with a normal time, even in the case in which a power outage occurs immediately before the battery exchange operation is started, the data that has been stored in the cache memory 143 can be safely saved to the flash memory device 144.

In the present embodiment having the configuration as described above, an operating mode for protecting data can be changed in accordance with a remaining power level of each of the batteries for the storage control apparatus SC that is provided with a redundant configuration that is made of a plurality of clusters.

In the present embodiment, the cache memory 143, the flash memory device 144, and the battery 146 are included in the memory package 140, and the data (the management data and the user data) in the cache memory 143 is saved to the flash memory device 144 by using an electrical power from the battery 146 in the case in which a power outage occurs. In the present embodiment, any one of a plurality of modes of a normal mode, a write through mode, and an access disable mode (a mode that is set in a not ready state) is selected as an operating mode by comparing a remaining power level of each of the batteries with the first and second threshold values Th1 and Th2. Consequently, in the present embodiment, both of a reliability and usability can be improved by using a redundant configuration of the storage control apparatus.

In the present embodiment, in the case in which the remaining power level of each of the batteries 146 is less than the second threshold value Th2, the storage control apparatus is set as a not ready state. In the case in which the not ready state of the storage control apparatus is continued for at least a predetermined period of time, the storage control apparatus is changed to be in a ready state forcibly. By the above configuration, the storage control apparatus can be prevented from being stopped for a long period of time, and usability can be suppressed from being deteriorated.

In the present embodiment, the first threshold value Th1 and the second threshold value Th2 are modified in accordance with the number of mounted cache memories 143. Consequently, since the settings of the first threshold value Th1 and the second threshold value Th2 can be modified in accordance with an amount of data to be saved, data can be protected more safely.

In the present embodiment, a threshold value related to the other battery that is not an exchange target is increased on a temporary basis during a battery exchange. Consequently, even in the case in which a power outage occurs in a battery exchange, the data that has been stored in the cache memory can be saved to the flash memory device. By this configuration, the safety can be improved.

Note that the present invention is not limited to the above mentioned embodiment. A person with an ordinary skill in the art, for example, may be able to carry out various types of addition, alteration, and others within the scope of the present invention.

REFERENCE SIGNS LIST

1 and 2: Clusters
3: Cache memory
4: Flash memory device
5: Battery
SC: Storage control apparatus
10: Controller chassis
20: Drive chassis
30: Maintenance center
100: Controller
101: AC/DC electrical power supply
130: Microprocessor package
140: Memory package
210: Storage apparatus

The invention claimed is:

1. A storage control apparatus that inputs/outputs data in accordance with a request from a higher level device, comprising a redundant configuration that is made of a plurality of clusters, wherein:

each of the clusters is provided with a first communication control unit that is configured to communicate with the higher level device;

a second communication control unit that is configured to communicate with a storage apparatus that stores data;

a memory unit that is used by the first communication control unit and the second communication control unit; and a mode control unit that is configured to control the first communication control unit and the second communication control unit, wherein the memory unit in each of the clusters is provided with a first memory having a volatile property, a second memory having a nonvolatile property, and a battery that is configured to supply an electrical power to the first memory, and the first memory is provided with a data memory that is configured to store data and a management data memory that is configured to store management data; and each of the mode control units is configured to control an operating mode for protecting data based on a remaining power level of each battery, wherein an operating mode that is configured to protect data includes:

a normal mode for notifying the higher level device of a write processing completion at a point of time when the write data the higher level device is stored into each of the data memories:

a write through mode for notifying the higher level device of a write processing completion after a point of time when the write data from the higher level device is stored into the data memory and the storage apparatus; and an access disable mode for inhibiting an access from the higher level device, wherein in the case in which at least one of remaining power levels of the battery capacities is equal to or larger than a first threshold value that enables to save the data and the management data that have been stored into the first memory to the second memory, the normal mode is selected;

in the case in which the both of remaining power levels of each of the batteries is less than the first threshold value and at least one of remaining power levels of the battery capacities is equal to or larger than a second threshold value that enables to save the management data that has been stored into the first memory to the second memory, the write through mode is selected; and in the ease in which the both of remaining power levels of each of the batteries is less than the second threshold value, the access disable mode is selected for a predetermined period of time.

2. The storage control apparatus according to claim 1, wherein:

each of the clusters is provided with a management terminal that is configured to manage a status in each of the clusters; and each of the mode control units
is provided with
a setting of a first threshold value that indicates a remaining power level of a battery that is required to save the data that has been stored into the data memory and the management data that has been stored into the management data memory to the second memory and
a second threshold value that indicates another remaining power level of a battery that is required to save the management data that has been stored into the management data memory to the second memory in such a manner that the threshold values can be changed; and is configured to:
detect the remaining power level of a battery in each of the clusters;
execute a first judgment for judging whether the remaining power level of a battery is equal to or larger than the first threshold value, in the case in which the result of the first judgment is positive;
execute a normal mode for notifying the higher level device of a write processing completion at a point of time when the write data from the higher level device is stored into each of the data memories, in the case in which the result of the first judgment is negative;
execute a second judgment for judging whether the remaining power level of one of the batteries is equal to or larger than the first threshold value and the remaining power level of the other of the batteries is less than the first threshold value, in the case in which the result of the second judgment is positive;
output an alarm via the management terminal and execute the normal mode, in the case in which the result of the second judgment is negative;
execute a third judgment for judging whether the remaining power level of the battery is equal to or larger than the second threshold value and is less than the first threshold value, in the case in which the result of the third judgment is positive;
output an alarm via the management terminal and execute a write through mode for notifying the higher level device of a write processing completion after a point of time when the write data from the higher level device is stored into the data memory that belongs to the cluster same as the control unit and the storage apparatus, in the case in which the result of the third judgment is negative;
execute a fourth judgment for judging whether the remaining power level of one of the batteries is equal to or larger than the second threshold value and the remaining power level of the other of the batteries is less than the second threshold value, in the case in which the result of the fourth judgment is positive;
output an alarm via the management terminal and execute a write through mode for the cluster same as the control unit, in the case in which the result of the fourth judgment is negative;
set an access disable state for inhibiting an access from the higher level device and output an alarm via the management terminal, in the case in which the result of the fourth judgment remains negative even after a predetermined period of time passes;
set an access able state for permitting an access from the higher level device and execute a write through mode, in the case in Which an input voltage to the battery is stopped;
start a save processing for transferring the data and the management data that have been stored into the first memory to the second memory for the cluster same as the mode control unit, in the case in which an input voltage to the battery is recovered, wherein
the save processing is stopped in the case in which the remaining power level of the battery is equal to or larger than the first threshold value; and
the save processing is continued in the case in which the remaining power level of the battery is less than the first threshold value; and
set the first threshold value in accordance with the number of the data memories that are included in the first memory and set the second threshold value in accordance with the number of the management data memories that are included in the first memory.

3. The storage control apparatus according to claim 1, wherein:
in the case in which the both of remaining power levels of each of the batteries is less than the second threshold value for a predetermined period of time, the access disable mode is switched to the write through mode.

4. The storage control apparatus according to claim 1, wherein:
in the case in which an input voltage to the battery is stopped,
each of the mode control units is configured to start a save processing for transferring the data and the management data that have been stored into the first memory to the second memory;
in the case in which an input voltage to the battery is recovered and the remaining power level of the battery is equal to or larger than the first threshold value that enables to save the data and the management data that have been stored into the first memory to the second memory,
the save processing is stopped; and
in the case in which an input voltage to the battery is recovered and the remaining power level of the battery is less than the first threshold value,
the save processing is continued, in the cluster to which the mode control unit belongs.

5. The storage control apparatus according to claim 4, wherein the first threshold value is set in accordance with the number of the data memories that are included in the first memory.

6. The storage control apparatus according to claim 5, wherein the second threshold value is set in accordance with the number of the management data memories that are included in the first memory.

7. The storage control apparatus according to claim 1, wherein:
in the case in which a battery of the cluster to which the mode control unit belongs among the clusters is exchanged, each of the mode control units is configured to increase the first threshold value that is included in the other control unit by a prescribed value.

8. A method for controlling an operating mode of a storage control apparatus, the storage control apparatus comprising a redundant configuration that is made of a plurality of clusters, wherein:
- each of the clusters is provided with a first communication control unit that is configured to communicate with a higher level device;
- a second communication control unit that is configured to communicate with a storage apparatus that stores data; and
- a memory unit that is used by the first communication control unit and the second communication control unit, the memory unit in each of the clusters is provided with:
- a first memory having a volatile property and provided with a data memory that is configured to store data and a management data memory that is configured to store management data;
- a battery that is configured to supply an electrical power to the first memory; and
- a second memory having a nonvolatile property, the operating mode includes:
  - a normal mode for notifying the higher level device of a write processing completion at a point of time when the write data from the higher level device is stored into the data memory;
  - a write through mode for notifying the higher level device of a write processing completion after a point of time when the write data from the higher level device is stored into the data memory and the storage apparatus; and
  - an access disable mode for inhibiting an access from the higher level device, wherein
    - in the case in which at least one of remaining power levels of the battery capacities is equal to or larger than the first threshold value that enables to save the data and the management data that have been stored into the first memory to the second memory, the normal mode is selected;
    - in the case in which the both of remaining power levels of each of the batteries is less than the first threshold value and at least one of remaining power levels of the battery capacities is equal to or larger than the second threshold value that enables to save the management data that has been stored into the first memory to the second memory, the write through mode is selected; and
    - in the case in which the both of remaining power levels of each of the batteries is less than the second threshold value, the access disable mode is selected for a predetermined period of time.

9. The operating mode control method of a storage control apparatus according to claim 8, wherein:
- in the case in which the both of remaining power levels of each of the batteries is less than the second threshold value for a predetermined period of time, the access disable mode is switched to the write through mode.

10. The operating mode control method of a storage control apparatus according to claim 8, wherein the first threshold value is set in accordance With the number of the data memories that are included in the first memory.

11. The operating mode control method of a storage control apparatus according to claim 8, wherein:
- in the case in which any one of the batteries is exchanged, the first threshold value is increased by a prescribed value for a cluster that is not provided with a battery that is an exchanged target in the clusters.

* * * * *